US012754552B2

(12) United States Patent
Davis

(10) Patent No.: US 12,754,552 B2
(45) Date of Patent: Oct. 6, 2026

(54) SYSTEMS AND METHODS FOR AUTOMATIC FIELD INFORMATION DETERMINATION

(71) Applicant: Deere & Company, Moline, IL (US)

(72) Inventor: Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 230 days.

(21) Appl. No.: 18/051,361

(22) Filed: Oct. 31, 2022

(65) Prior Publication Data

US 2024/0142986 A1 May 2, 2024

(51) Int. Cl.

*G05D 1/00* (2024.01)
*A01B 69/00* (2006.01)
*A01B 69/04* (2006.01)

(52) U.S. Cl.

CPC ......... *G05D 1/0274* (2013.01); *A01B 69/001* (2013.01); *A01B 69/008* (2013.01); *G05D 1/0221* (2013.01); *G05D 1/0242* (2013.01)

(58) Field of Classification Search

CPC .. G05D 1/0274; G05D 1/0221; G05D 1/0242; G05D 1/6486; G05D 2105/15; G05D 2107/21; G05D 2109/10; G05D 1/246; A01B 69/001; A01B 69/008; A01B 79/005

See application file for complete search history.

(56) References Cited

U.S. PATENT DOCUMENTS 8,855,405 B2 10/2014 Mas et al.
10,395,115 B2 8/2019 Kumar et al.
2014/0343803 A1* 11/2014 Losch .................... G06Q 10/06 701/50
2017/0031365 A1* 2/2017 Sugumaran .......... G05D 1/0219
2018/0092295 A1* 4/2018 Sugumaran .......... A01C 21/005
2018/0243772 A1* 8/2018 Davis .................. A01M 7/0057
2018/0348760 A1 12/2018 Peverill et al.
2019/0102623 A1* 4/2019 Flood ..................... A01G 23/00
2019/0113936 A1* 4/2019 Anderson ................ G08G 5/55

(Continued)

OTHER PUBLICATIONS

Row Crop's Identification Through Hough Transform using Images Segmented by Robust Fuzzy Possibilistic C-Means (researchgate.net) Nov. 2011, 11 pages.

(Continued)

*Primary Examiner* — Anne Marie Antonucci
*Assistant Examiner* — Luis G Del Valle
(74) *Attorney, Agent, or Firm* — Christopher J. Volkmann; KELLY, HOLT & CHRISTENSON PLLC

(57) ABSTRACT

Methods and systems for generating a worksite map that indicates locations of characteristics and items in the field includes operating a mobile machine outfitted with a position sensor system and a multi-spectral observation sensor system in a non-plants of interest area, such as a headland or a road. Determining the locations of characteristics and items in the worksite, and external to the mobile machine, based on the sensor data generated by the multi-spectral observation sensor system and the position sensor system while the mobile machine is in the non-plants of interest area. Generating the map of the worksite that indicates the characteristics and items at their respective locations in the worksite. In some examples, the method can further include generating a control output based on the map of the worksite.

20 Claims, 14 Drawing Sheets

(56) References Cited

U.S. PATENT DOCUMENTS

| | | | | |
|---|---|---|---|---|
| 2020/0073389 | A1* | 3/2020 | Flajolet | G06T 7/579 |
| 2020/0332479 | A1* | 10/2020 | O'Donnell | E01C 19/48 |
| 2021/0000006 | A1* | 1/2021 | Ellaboudy | A01B 69/001 |
| 2021/0341944 | A1* | 11/2021 | Schoon | A01B 79/005 |
| 2023/0091677 | A1* | 3/2023 | Brown | G06N 5/01<br>702/2 |

OTHER PUBLICATIONS

A New Method for Crop Row Defection Using Unmanned Aerial Vehicle Images (researchgate.net), Published Sep. 5, 2021, 16 pages.

* cited by examiner

SYSTEMS AND METHODS FOR AUTOMATIC FIELD INFORMATION DETERMINATION

FIELD OF THE DESCRIPTION

The present descriptions relate to mobile machines, particularly mobile agricultural machines configured to perform an agricultural operation on a field.

BACKGROUND

There are a wide variety of different mobile machines. Some mobile machines, such as sprayer or harvesters, may utilize information about the field at which they are to operate to establish parameters of the operation. For example, mobile machines, such as sprayer or harvesters, may utilize plants of interest row location and boundary locations of the field to establish a planned route through the field as well as other parameters of the operation.

The discussion above is merely provided for general background information and is not intended to be used as an aid in determining the scope of the claimed subject matter.

SUMMARY

Methods and systems for generating a worksite map that indicates locations of characteristics and items in the field includes operating a mobile machine outfitted with a position sensor system and a multi-spectral observation sensor system in a non-plants of interest area, such as a headland or a road. Determining the locations of characteristics and items in the worksite, and external to the mobile machine, based on the sensor data generated by the multi-spectral observation sensor system and the position sensor system while the mobile machine is in the non-plants of interest area. Generating the map of the worksite that indicates the characteristics and items at their respective locations in the worksite. In some examples, the method can further include generating a control output based on the map of the worksite.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
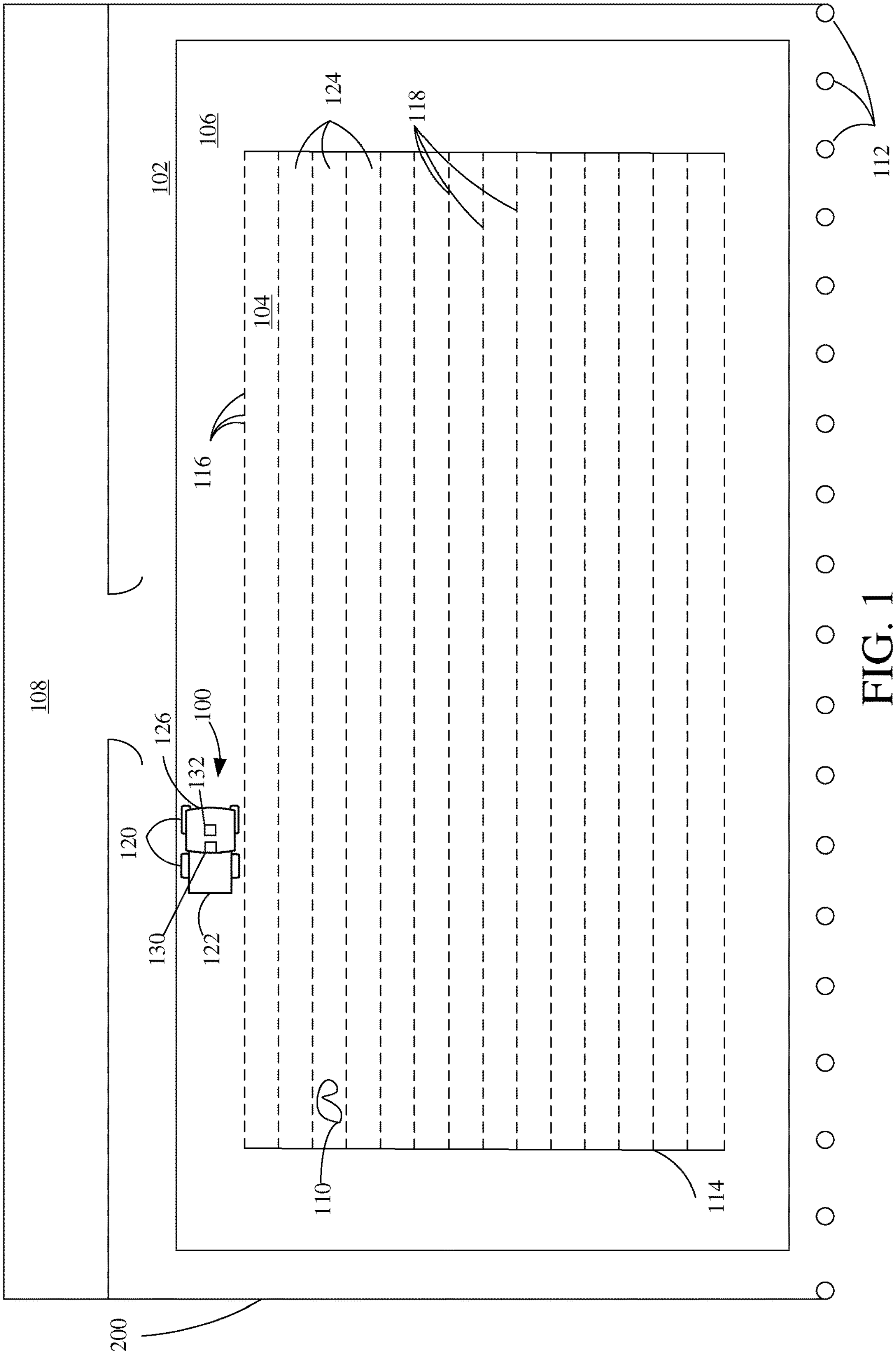
FIG. 1 illustrates a representation of one example of an agricultural environment.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In some examples, the present description relates to using data detected by sensors of a machine, such as an agricultural machine, a forestry machine, a construction machine, or a turf management machine, to geolocate items at a worksite (e.g., field, forest, construction site, turf site, etc.) of interest, such as plant, non-plant objects, boundaries of portions of the worksite, as well as plant locations and non-plant object locations. In some examples, the data can be used to generate a map of the worksite which may include indicators, such as display elements, that indicate the location of the various items in the field. In some examples, the map can be used to control a mobile machine as it operates at the worksite.

As discussed above, mobile machines, such as agricultural machines, forestry machines, construction machines, and turf management machines, are operated at a worksite to perform an operation. The operating parameters of the mobile machines may be predicated on certain characteristics of the worksite, such as the area of the portion of the worksite containing plants of interest (e.g., plants of interests, timber, grass/turf, etc.) or where plants of interest are to be located (e.g., a plant of interest area such as a crop area, a timber area, a turf area, etc.) as defined by the boundaries of the portion of the worksite containing plants of interest or where plants of interest are to be located (e.g., the boundaries of the plant of interest area), the locations and spacing of the plants of interest, the locations of non-plant objects, as well as the location of other items at the worksite. For example, a desired route of the mobile machine may be determined, based on the characteristics of the worksite, to navigate the worksite in the shortest amount of time (e.g., minimum number of passes), while avoiding overlap (traveling over the same area more than once), avoiding driving over (or otherwise contacting), with ground-engaging traction elements of the mobile machine, the plants of interest, and avoiding driving over (or otherwise contacting) non-plant objects. Inaccurate geolocation of the plants of interest, the plants of interest area, and non-plant objects may result in additional passes of the machine, overlap, damage to the plants of interests, and contact with non-plant objects. Further, with some machines, such as agricultural sprayers or planters, other desired parameters of the machine may be determined, based on the characteristics of the worksite. For instance, the parameters of the sprayer or planter (e.g., rate at which the sprayer or planter applies material (application rate), whether material is applied at a given location, etc.) may be determined based on the total area of the plant of interest portion of the worksite as well as the location of plants of interest at the field. For example, some substances may have recommended application per area unit (e.g., volume per acre). Additionally, where no plant of interest is present, it may be desirable to prevent application of sprayed material. Over application of the sprayed material may result in damage to the environment or the plants of interest, or both, and can increase expense. Under application may result in poorer yields.

In some current systems, and as an example, the plant information (e.g., plant of interest area, plants of interest locations, plants of interest spacings) can be indicated by georeferenced data from a planting operation and can be utilized by later machines, such as sprayers or harvesters. However, for a variety of reasons, the plants of interest information may change between the time the plants of interest (e.g., crop) is planted and the time of a subsequent spraying or harvesting information. Further, the information provided from the previous planting operation may not indicate the location of non-plant objects. In some current systems, machines, such as sprayers, may travel around the boundaries (e.g., headlands, roads, paths, etc.) of the plants of interest area and utilize GPS information to define the boundaries of the plants of interest area (e.g., crop area). In some examples, a boom of the sprayer may be deployed and placed as closely to the edge of the plants of interest (e.g., crop as possible such that a prefixed offset between the GPS receiver and the plant of interest edge (e.g., crop edge) (boundary of the plants of interest area or crop area) can be determined. However, the boom may not be kept in perfect compliance with the boundary of the plants of interest area and thus geolocation error may result. Further, this information does not provide the location of spacing between plants of interest (e.g., the locations of crop rows) and non-plant objects.

In one example, the present description relates to a mobile machine, such as a mobile agricultural machine, a mobile forestry machine, a mobile construction machine, or a mobile turf management machine, that includes a plurality of sensors, such a position sensor (e.g., global position sensor, etc.) and one or more observation sensors. The position sensor detects a position of the machine. The observation sensor(s) detect plants (e.g., crops, timber, turf/grass, other plants) and non-plant objects. Based on the position of the observation sensor(s), relative to the position sensor, and the data captured by the observation sensor(s), locations of the boundaries of the plants of interest area, the locations of the plants of interest, the spacing of the plants of interest (e.g., locations of crop rows), and the locations of non-plant objects can be determined. In some examples, a map of the field can be generated that indicates the location of the plants of interest area, the locations of plants of interest, the spacing of plants of interest (e.g., locations of crop rows), and the locations of non-plant objects. Based on the map of the field or the locations, operating parameters of the mobile machine can be determined and the machine may be controlled based thereon.

While certain examples described herein proceed with example mobile agricultural machines (e.g., sprayers, harvesters, etc.), it will be understood that the methods and systems described herein are applicable to other mobile machines, such as other mobile agricultural machines (e.g., planters, etc.), mobile forestry machines (e.g., feller bunchers, forwarders, timber harvesters, knuckleboom loaders, etc.), mobile construction machines (e.g., excavators, skid steers, loaders, dozers, graders, back hoes, etc.), mobile turf management machines (e.g., mowers, rakes, aerators, etc.), as well as various other mobile machines. Additionally, while certain examples described herein proceed with example agricultural operations (e.g., spraying, harvesting, etc.), it will be understood that the methods and systems described herein are applicable to other types of operations, such as other types of agricultural operations (e.g., planting), forestry operations, construction operations, turf management operations, as well as various other operations.

FIG. 1 shows a representation of an agricultural environment 200. Agricultural environment 200 includes a mobile machine 100, a worksite (e.g., field) 102, plants of interest (e.g., crop) area 104, non-plants of interest (e.g., non-crop) areas 106 and 108, and non-plant (e.g., non-crop) objects 110 and 112. Mobile machine 100, in the illustrated example, can be a mobile agricultural machine (e.g., a mobile agricultural sprayer, a mobile agricultural harvester, etc.). Mobile machine 100 includes ground-engaging traction elements 120, propulsion subsystem compartment 122, a position sensor system 130, and an observation sensor system 132. Propulsion subsystem compartment 122 houses elements of a propulsion subsystem that drives the ground-engaging traction elements 120 to propel the mobile machine 100. While the position sensor system 130 and observation sensor system 132 are shown, for illustrative purposes, at particular locations on mobile machine 100, it will be appreciated that in other examples, system 130 or system 132, or both, can be located at other locations on mobile machine 100 or distributed in various ways on mobile machine 100. For instance, where observation sensor system 132 includes multiple observation sensors, each observation sensor may be located at a different location on mobile machine 100. Position sensor system 130 and observation sensor system 132 will be discussed in greater detail in FIG. 2.

Mobile machine 100 can travel in non-plants of interest areas 106 and/or 108, as well as plants of interest area 104. Non-plants of interest area 106 is illustratively a headland of the field 102 and non-plants of interest area 108 is illustratively a road. Plants of interest area 104 is an area of the worksite 102 that includes plants of interests. Plants of interest area 104 is defined by a border (or boundary or plants of interest (e.g., crop) edge) 114 that is a continuous line that is located at the furthest extent to which plants of interest (e.g., crop extends in the worksite 102. While plants of interest area 104 is shown as generally rectangular in shape in FIG. 1, it will be appreciated that in other examples, plants of interest areas can be of a variety of shapes, including irregular shapes. Plants of interest area 104 can include a plurality of plants of interest (e.g., crop) rows 118. Plants of interest rows 118 are separated from each other by a given space 124. Each plants of interest row includes a plurality of individual plants of interests 116. In some instances, a worksite (e.g., field) may not include headlands 106 on all sides of the plants of interest area 104 (or may not include any headlands 106), in which case, mobile machine 100 may travel in other non-plants of interest areas, such as a road 108, or other non-plants of interest areas, and detect characteristics of the worksite. It will be appreciated that the border 114 of the plants of interest area 104 may be defined by the outermost plants of interest row or outermost plants of interest. For example, as illustrated in FIG. 1, the border 114 of the plants of interest area 104 at the top and bottom is formed by (or coincides with) the outermost plants of interest rows 118 (e.g., the top and bottom plants of interest rows) while the border 114 of the plants of interest area 104 at the left and right are formed by (or coincides with) the outermost plants of interest 116 of each row 118. It will be appreciated that this arrangement is due to the directionality of the plants of interest rows (e.g., east-west in the FIGS.) and that it will change as the direction of the plants of interest rows change, for example, for plants of interests running north-south, the bottom and top of the border of the plants of interest area may be formed by (or coincide with) the outermost plants of interest plants of each plants of interest row and the left and right of the border of the plants of interest area may be formed by (or coincide with) the outermost plants of interest rows (e.g. the further left plants of interest row and the furthest right plants of interest row).

As mobile machine 100 travels in non-plants of interest areas 106 and/or 108, position sensor system 130 illustratively detects the position (geolocation) of mobile machine 100 and observation sensor system 132 detects characteristics of the worksite external of the mobile machine, such as the boundary 114 of plants of interest area 104, plants of interests 116 in plants of interest area 104, plants of interest rows 118 in plants of interest area, spaces 124 between plants of interest rows 118, as well as non-plant objects 110 and 112. Based on the position information detected by position sensor system 130, the position of the observation sensor system 132 relative to the position sensor 130, and the data detected by the observation sensor system 132, the location of the boundary 114, the locations of the plants of interests 116, the locations of the plants of interest rows 118, the locations of the spaces 124, and the locations of non-plant objects 110 and 112 in the field 102 can be determined.

Based on the boundary 114 of plants of interest area 114, the locations of plants of interests 116, the locations of plants of interest rows 118, and the locations of spaces 124 operation parameters of the mobile machine 100 may be determined. For example, a route for mobile machine 100 to travel through plants of interest area 104 and/or at field 102 may be determined, such as route that minimizes the number of passes of mobile machine 100, avoids overlap, and causes ground-engaging traction elements 120 to travel in spaces 124 or otherwise avoid contact with plants of interest 116 and/or non-plant objects 110 and 112. Other operating parameters can also be determined, for example, where mobile machine 100 is a sprayer, the application rate may be determined based on the size (e.g., acreage) of plants of interest area 104 as defined by boundary 114. These are merely some examples.

As illustrated in FIG. 1, non-plant object 110 comprises a rock and non-plant objects 112 comprise non-plant objects on the border of worksite 102 such as fence posts, telephone lines, etc. In some examples, the operating parameters of mobile machine 100 may be determined based on the locations of non-plant objects. For example, a route for the mobile machine 100 may be determined that avoids travel of the ground-engaging traction elements 120 in the location of the non-plant objects or near the location of non-plant objects. For example, a route for the mobile machine 100 may be generated such that the ground-engaging traction elements 120 do not travel in the space 124 in which the rock 110 is located. In other examples, a route for mobile machine 100 may be generated to avoid contact with non-plant objects 112. For instance, where mobile machine 100 is a sprayer having a boom that extends laterally away from the frame of the mobile machine 100, a route can be generated such that mobile machine 100 does not perform a pass which would cause the path of the boom to intersect with the locations of the non-plant objects 112. These are merely some examples.

Where mobile machine 100 can be operated by a local operator, mobile machine 100 can include an operator compartment or cab 126 which can include a variety of different operator interface mechanisms (e.g., 318 shown in FIG. 2) for controlling mobile machine 100 as well as for displaying various data. Where mobile machine 100 can be fully autonomous or otherwise controlled by a remote operator, mobile machine 100 may or may not include operator compartment or cab 126.

While the example in FIG. 1 shows a worksite such as an agricultural field, it will be understood that the systems and methods described herein are applicable to other environments, such as forests, constructions sites, turf sites, etc.

Figure 2:
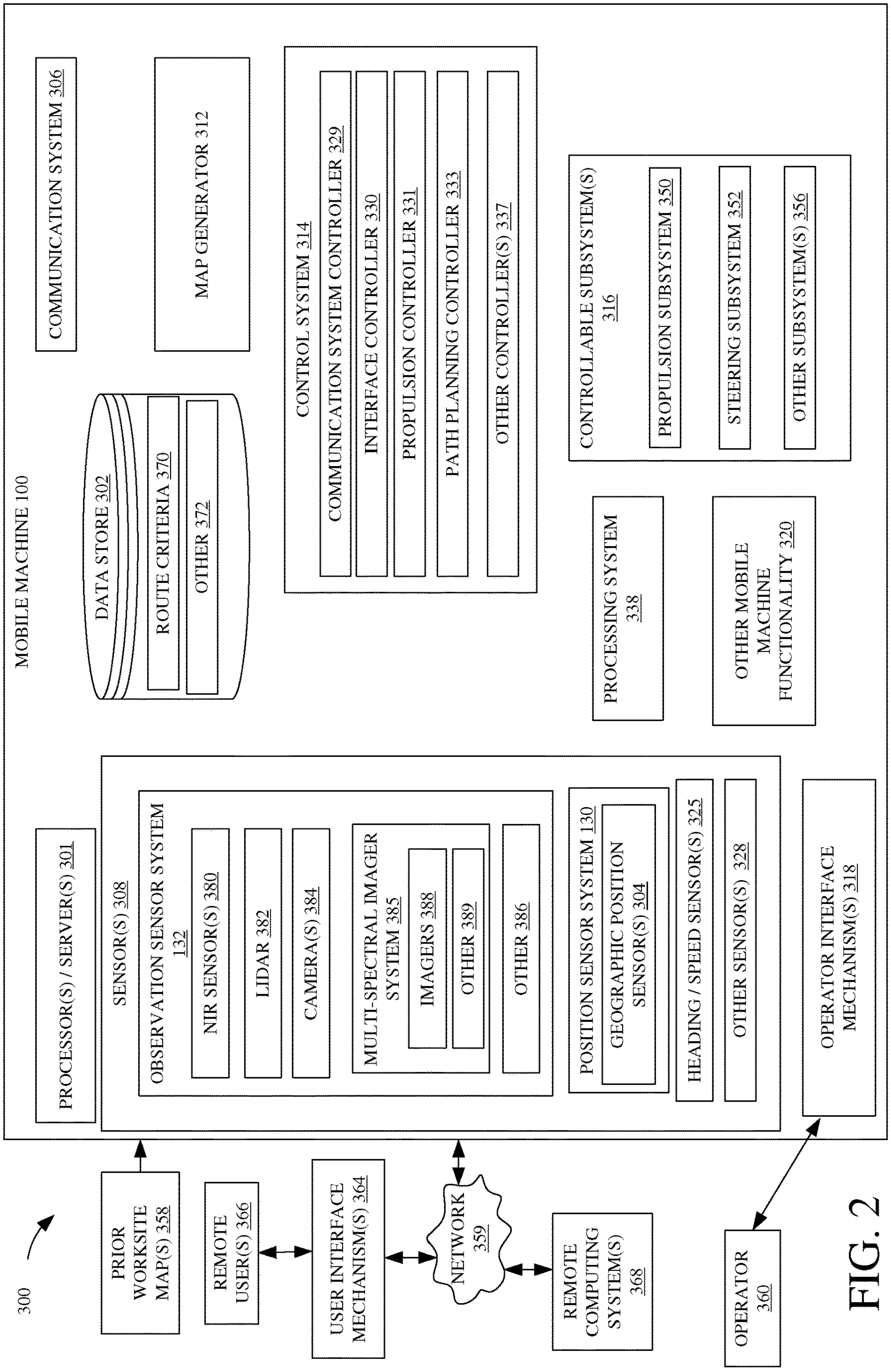
FIG. 2 is a block diagram showing some portions of a machine operation system, including a mobile machine, in more detail, according to some examples of the present disclosure.

FIG. 2 is a block diagram showing some portions of a machine operation system architecture 300 (also referred to herein as machine operation system 300). FIG. 2 shows that machine operation system architecture 300 includes mobile machine 100, one or more remote computing systems 368, one or more remote user interfaces 364, and network 359. Mobile machine 100, itself, illustratively includes one or more processors or servers 301, data store 302, communication system 306, one or more sensors 308 that sense one or more characteristics at a worksite, and a processing system 338 that processes the sensors data (e.g., signals, images, etc.) generated by sensors 308 to generate processed sensor data. The sensors 308 generate sensor data indicative of characteristics. Mobile machine 100 also includes map generator 312, control system 314, one or more controllable subsystems 316, and operator interface mechanism(s) 318. The mobile machine 100 can also include a wide variety of other machine functionality 320.

Sensors 308 illustratively include position sensor system 130, observation sensor system 132, one or more heading/speed sensors 325, and can include various other sensors 328. Position sensor system 130 illustratively includes one or more geographic position sensors 304. Observation sensor system 132 illustratively includes one or more observation sensors such as one or more near-infrared (NIR) sensors 380, one or more LiDAR sensors 382, one or more cameras (e.g., stereo cameras, etc.) 384, one or more multi-spectral imager systems 385, and can include various other types of observation sensors 386.

Geographic position sensors 304 illustratively sense or detect the geographic position or location of mobile machine 100 and generate sensor data indicative thereof. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors. In some examples, the geographic position or location detected by geographic position sensors 304 can be processed to derive a geographic position or location of a given component of mobile machine 100, such as the geographic position or location of another sensor (e.g., one or more of the sensors of observation sensor system 132). The dimensions of the mobile machine, such as the distance of certain components from the geographic position sensors 304, which can be stored in data store 302 or otherwise provided, can be used, in combination with detected geographic position or location, to derive the geographic position or location of the component. This processing can be implemented by processing system 338.

Observation sensor system 132 illustratively detects characteristics of the worksite, such as plants of interest, plants of interest rows, spaces between plants of interest rows, plants of interest area boundary, non-plant objects, as well as other characteristics. In some examples, different types of sensors can be used to detect respective characteristics. For example, NIR sensors 380 may generate sensor data that can be used to distinguish plant matter (e.g., plant objects) from non-plant matter (non-plant objects). However, identifying the particular type of plant (e.g., crop or other plant) or the particular type of non-plant matter (e.g., a rock, fence posts, telephone lines, human, animal, etc.) may require or may be more effective using other types of sensors or using machine learning functionalities, such as a neural network. Thus, machine operation system 300 may be able to detect certain characteristics of the field without the use of machine learning, such as neural network, while, for other characteristics, may utilize machine learning, such as a neural network. Additionally, sensor data from multiple different types of sensors of observation sensors system 132 can be fused to determine characteristics of the object, for example, an NIR sensor 380 may identify an object as a plant and a LiDAR sensor 382 (or other time of flight sensor) may indicate the distance of the identified plant from the LiDAR sensor which can, in turn, be used, in combination with the geographic position of the LiDAR sensor (as derived from the geographic position or location data generated by geographic position sensors 304 and machine dimensionality), to determine the geographic position or location of the plant.

NIR sensors 380 illustratively emit NIR light and receive the NIR light reflected from objects. The received NIR light is analyzed to determine characteristics such as the identification of plant matter (e.g., plant objects) and non-plant matter (e.g., non-plant objects). NIR sensors 380 may include filters that filter out certain wavelengths, such as the visible light spectrum to filter out ambient light.

LiDAR sensors 382 illustratively emit pulsed light beams (pulsed laser beams) which reflect from objects in the environment and are received by the LiDAR sensor(s) 382. The time it takes for each pulse to return to the LiDAR sensors 382 can be used to calculate the distance the pulse travelled and thus to derive a 3D profile (point cloud) of the surrounding environment. Thus, the LiDAR can be used to detect the location of objects (e.g., plants and non-plant objects) in the environment.

Cameras 384 can include one or more different types of cameras, for example, mono or stereo cameras, or both. Cameras 384 capture images of the surrounding environment. The images captured by camera can be analyzed to detect objects in worksite or in the environment of the worksite, as well as characteristics of the objects, such as object type (e.g., plant and non-plant objects), object location (relative to the camera(s) 384), as well as various other characteristics.

Multi-spectral imager system 385 can include multiple imagers 388, each imager 388 configured to utilize a different region of the electromagnetic spectrum (e.g., capture electromagnetic radiation from a different region of the electromagnetic spectrum). As is appreciated by those skilled in the art, the electromagnetic spectrum is generally divided into seven regions, commonly designated as radio waves, microwaves, infrared (including near and far infrared sub-regions), visible light, ultraviolet, X-rays, and gamma rays. Thus, the multi-spectral imager system 385 may comprise a plurality of separate imagers 388, each imager 388 having a designated region of the electromagnetic spectrum (e.g., designated to capture radiation from a respective region of the electromagnetic spectrum), for example, but not by limitation, the multi-spectral imager system 385 may include an imager 388 designated to capture infrared (e.g., NIR) and an imager 388 designated to capture visible light. The multi-spectral imager system 385 may include various other items 389, for example, but not by limitation, a filter for each respective imager 388. Further, the multi-spectral imager system may include, as other items 389, one or more transmitters that transmit electromagnetic radiation which is reflected from an object of interest and captured by an imager.

Observation sensor system 132 can include various other types of observation sensors 386, including, but not limited to, various other types of electromagnetic radiation sensors, such as radar sensors, as well as other types of sensors that do not utilize electromagnetic radiation, such as ultrasound or sonar sensors.

It will be appreciated that observation sensor system 132 can be a multi-spectral observation sensor system in that it can include two or more sensors (e.g., two or more of an NIR sensor 380, a lidar 382, a camera 384, and an other type of observation sensor 386), each sensor utilizing a different region of the electromagnetic spectrum. In other examples, observation sensor system 132 can be a multi-spectral observation sensor system in that it can comprise a multi-spectral imager 385 that includes two or more imagers, each imager utilizing a different region of the electromagnetic spectrum.

Heading/speed sensors 325 detect a heading and speed at which mobile machine 100 is traversing the worksite during the operation. This can include sensors that sense the movement of ground-engaging traction elements 120 or can utilize signals received from other sources, such as geographic position sensor 304. Thus, while heading/speed sensors 325 as described herein are shown as separate from geographic position sensor 304, in some examples, machine heading/speed is derived from signals received from geographic positions sensors 304 and subsequent processing. In other examples, heading/speed sensors 325 are separate sensors and do not utilize signals received from other sources.

Other sensors 328 may be any of a variety of other types of sensors.

Processing system 338 processes the sensor data generated by sensors 308 to generate processed sensor data indicative of characteristics. For example, processing system generates processed sensor data indicative of worksite characteristics (such as plants of interest area boundary location, plants of interest area size, plants of interest locations, plants of interest row locations, locations of spaces between plants of interest rows, non-plant object locations, types of plants, types of non-plant objects, etc.) based on sensor data generated by observation sensor system 132, geographic locations or positions based on sensor data generated by position sensor system 130, machine speed or heading, or both, based on sensor data generated by heading/ speed sensors 325, as well as various other characteristics based on sensors data generated by various other sensors 328.

It will be understood that processing system 338 can be implemented by one or more processers or servers, such as processors or servers 301. Additionally, processing system 338 can utilize various sensor data processing functionalities, such as various filtering functionalities, noise filtering functionalities, categorization, aggregation, normalization, as well as various other processing functionalities. Similarly, processing system 338 can utilize various processing functionalities such as, sequential image comparison, RGB color extraction, edge detection, black/white analysis, machine learning, neural networks, pixel testing, pixel clustering, shape detection, as well any number of other suitable processing and data extraction functionalities.

Processing system 338 will be described in greater detail in FIG. 3.

FIG. 2 shows that an operator 360 may operate mobile machine 100. The operator 360 interacts with operator interface mechanisms 318. The operator 360 may be local to mobile machine 100 or may be remote from mobile machine 100. In some examples, operator interface mechanisms 318 may include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, operator 360 may interact with operator interface mechanisms 318 using touch gestures. These examples described above are provided as illustrative examples and are not intended to limit the scope of the present disclosure. Consequently, other types of operator interface mechanisms 318 may be used and are within the scope of the present disclosure. Further, where the operator is remote, one or more operator interface mechanisms 318 may be located at the remote location of the operator.

FIG. 2 also shows one or more remote users 366 may interact with mobile machine 100 or remote computing systems 368, or both, through user interface mechanisms 364 over network 359. User interface mechanisms 364 can include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, a remote user 364 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems 368, by remote users 366, or by remote operators 360. As will be described below, in some examples, one or more of the components shown being disposed on mobile machine 100 in FIG. 2 can be located elsewhere, such as at remote computing systems 368, user interface mechanisms 364, or remote operator interface mechanisms 318.

FIG. 2 also shows that mobile machine 100 can obtain one or more prior maps of a worksite. The prior worksite maps 358 may be generated prior to (or based on data that was collected prior to) a current operation. The prior worksite maps may show the boundaries of the worksite, the location of roads near the worksite, as well as other characteristics. The prior worksite maps 358 may include global position information relative to the worksite, such as the global position of the worksite.

Prior worksite maps 358 may be downloaded onto mobile machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

Data store 302 may store one or more data items. In the illustrated example, data store 302 stores route criteria 370 and can store various other data items 372, some of which will be described below. As an example, data store 302 can store, as an example of other data items 372, computer executable instructions that are executable by one or more processors or servers (e.g., 301) to provide one or more the functionalities or implement one or more of the items of system 300.

Map generator 312 receives processed sensor data generated by processing system 338 and illustratively generates a map of the worksite (e.g., 460 or 470 shown in FIG. 4) based thereon. The map of the worksite (e.g., field) indicates one or more characteristic of the worksite, such as the plants of interest area (as defined by the geolocated plants of interest area boundary), plants of interests at their locations in the worksite, plants of interest rows at their locations in the field, the locations of spaces between plants of interest rows at the field, the locations of non-plant objects, the location of mobile machine 100, the location of non-plants of interest areas, as well, in some examples, a prescribed or planned route of the mobile machine 100 (e.g., a route determined by path planning controller 333). Various display elements or display element characteristics can be used to distinguish the different characteristics, such as different symbols, different colors, different patterns, etc. In some examples, map generator 312 utilizes a prior worksite map 358 and maps the worksite characteristics into the prior worksite map 358 at their locations in the worksite to generate a worksite map (e.g., 460). In some examples, map generator 312 utilizes information, such as the global position of the worksite from a prior worksite map 358 to generate a worksite map (e.g., 460). Additionally, map generator 312 can dynamically update the worksite map based on additional sensor data that is collected, such as additional sensor data that is collected as the mobile machine 100 travels in non-plants of interest areas and/or additional sensor data that is collected as the mobile machine travels or operates in the plants of interest area.

Thus, map generator 312 can generate an updated (or revised) worksite map (e.g., 470) as the machine travels or operates at the worksite. Map generator 312 will be shown in greater detail in FIG. 4.

FIG. 2 also shows that mobile machine 100 includes a control system 314 and one or more controllable subsystems 316. The control system 314 and the controllable subsystems 316 may vary based on the type of mobile machine 100. Processed sensor data generated by processing system 338 or a field map (e.g., 460 or 470) generated by map generator 312, or both, are provided to control system 314. Control system 314 then generates control signals to control items of machine operation system 300.

FIG. 2 shows that control system 314 includes communication system controller 329, interface controller 330, propulsion controller 331, path planning controller 333, and can include various other controllers 337. As shown in FIG. 2, controllable subsystems 316 include propulsion subsystem 350, steering subsystem 352, and can include various other controllable subsystems 356.

In some examples, communication system controller 329 controls communication system 306 to communicate the processed sensor data generated by processing system 338, worksite map(s) generated by map generator 312, or control signals (or determinations generated by control system 314, such as a route) to one or more remote systems, such as remote computing systems 368, user interface mechanisms 364, and remote operator interface mechanisms 318.

Interface controller 330 is operable to generate control signals to control interface mechanisms, such as operator interface mechanisms 318 or user interface mechanisms 364, or both. The interface controller 330 is also operable to present one or more of the processed sensor data, the generated worksite map(s), and determinations (e.g., routes), to operator 360 or a remote user 366, or both. As an example, interface controller 330 generates control signals to control a display mechanism to display a generated field map to the operator 360 or a remote user 366, or both. Interface controller 330 may generate operator or user actuatable mechanisms that are displayed and can be actuated by the operator or user to interact with the displayed map.

Propulsion controller 331 illustratively generates control signals to control propulsion subsystem 350 to control a speed setting, such as one or more of travel speed, acceleration, deceleration, and propulsion direction (e.g., forward and reverse), based on one or more of the generated processed sensor data and the generated worksite map(s). The propulsion subsystem 350 includes various powertrain elements, such as a motor (electric motor) or engine (internal combustion engine), a gear box (e.g., transmission), as well as various actuators. Propulsion subsystem 350 is controlled by propulsion controller 331 to drive ground-engaging traction elements 120 to propel mobile machine 100.

Path planning controller 333 illustratively generates control signals to control steering subsystem 352 to steer mobile machine 100 according to a desired path (e.g., a desired route) or according to desired parameters, such as desired steering angles based on one or more of the generated processed sensor data and the generated worksite map(s). Path planning controller 333 can generate a route for mobile machine 100 and can control propulsion subsystem 350 and steering subsystem 352 to steer agricultural mobile machine 100 along that route. Steering subsystem 352 includes one or more actuators to control the steering angle of one or more ground engaging traction elements of mobile machine 100. As an example, path planning controller 333 may determine and generate a route based on a worksite map generated by map generator 312 and route criteria 370. The route criteria 370 may be preselected by a user or operator. The route criteria 370 may be stored in a data store, such as data store 302. The route criteria 370 may indicate one or more preselected or preset preferences, such as one or more of a preference to minimize a number of a passes of the mobile machine, a preference to minimize (or eliminate) overlap, a preference to avoid contact between mobile machine 100 (or a part of mobile machine 100, such as the ground engaging-traction elements 110 or an implement, a tool, an attachment, or other component) and plants of interest or non-plant objects, or both. Thus, based on a field map generated by map generator 312 and route criteria 370, path planning controller 333 may generate a route that does one or more of minimizes the number of passes of the mobile machine 100 in the plants of interest area, minimizes (or eliminates) overlap, and avoids contact between the mobile machine 100 and the plants of interest or non-plant objects, or both.

Control system 314 can include various other controllers 337 that can control other subsystems 356 based on one or more of the generated processed sensor data or the generated worksite map(s). For example, where mobile machine 100 is a sprayer, mobile machine 100 may include, as an other subsystem 356, an application subsystem that applies material (e.g., fluid) to the field at a given rate. In such an example, the mobile machine 100 may include, as an other controller 337, an application controller which controls the application subsystem to control the rate at which material is applied. In another example, the mobile machine 100 may include, as an other subsystem 356, a position subsystem that controls a position (e.g., height or depth, tilt or pitch, roll, yaw, etc.) of one or more components (e.g., tools, implements, attachments, etc.) of mobile machine 100. In such an example, the mobile machine 100 may include, as an other controller 337, a position subsystem controller which controls the position subsystem to control the position of one or more components of the mobile machine 100. These are merely some examples.

While the illustrated example of FIG. 2 shows that various components of machine operation system architecture 300 are located on mobile machine 100, it will be understood that in other examples one or more of the components illustrated on mobile machine 100 in FIG. 2 can be located at other locations, such as one or more remote computing systems 368. For instance, one or more of data stores 302, map generator 312 and processing system 338, can be located remotely from mobile machine 100 but can communicate with mobile machine 100 via communication system 306 and network 359. Thus, the worksite maps and processed sensor data may be generated at remote locations away from mobile machine 100 and can be communicated to mobile machine 100 over network 359. For example, communication system 306 can download the generated worksite maps and processed sensor data from the remote locations and store them in data store 302. In other examples, mobile machine 100 may access the worksite maps and processed sensor data at the remote locations without downloading them. The information used in the generation of the worksite maps may be provided to the map generator 312 at those remote locations over network 359. The information used in the generation of the processed sensor data may be provided to the processing system 338 at those remote locations over network 359.

In some examples, control system 314 can be located remotely from mobile machine 100 such as at one or more of remote computing systems 368 and remote user interface mechanisms 364. In other examples, a remote location, such as remote computing systems 368 or user interface mechanisms 364, or both, may include a respective control system which generates control values that can be communicated to mobile machine 100 and used by on-board control system 314 to control the operation of mobile machine 100. These are merely examples.

Figure 3:
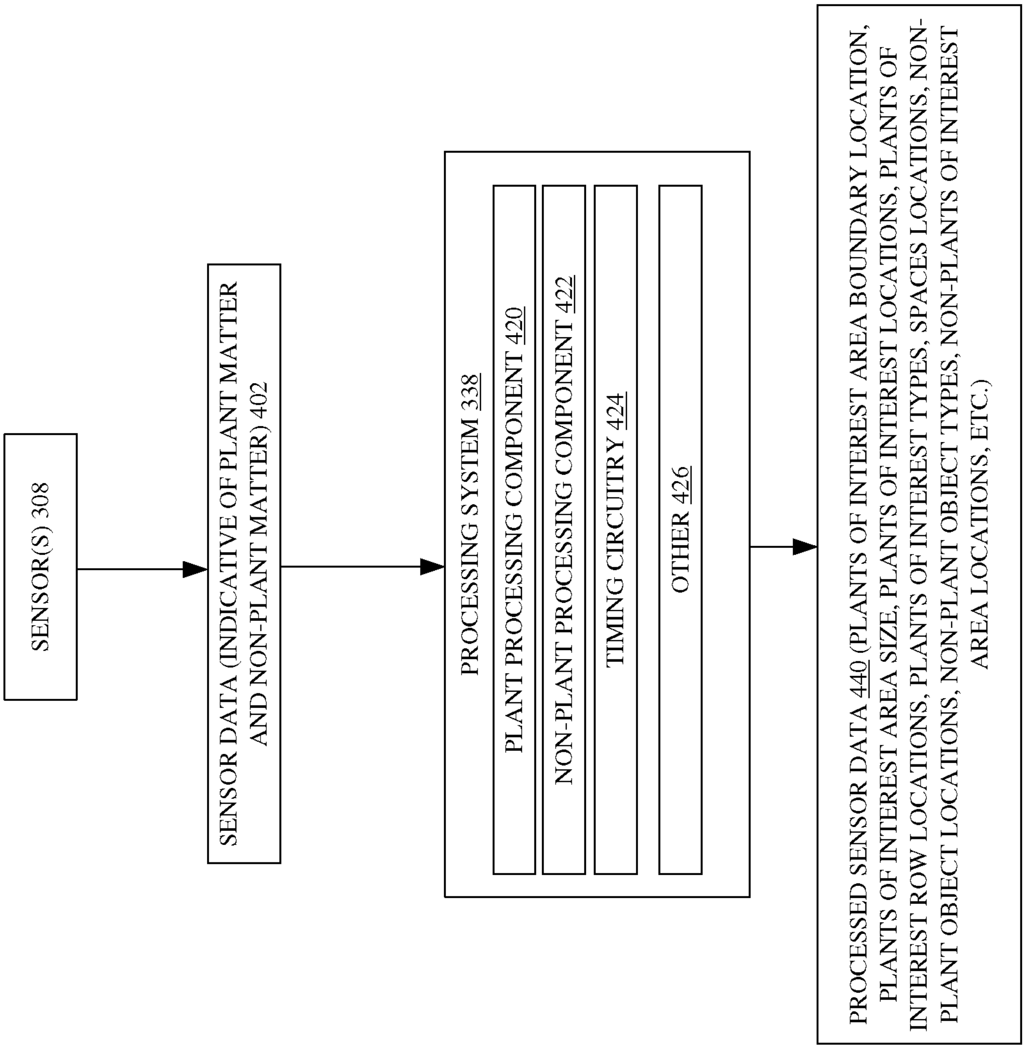
FIG. 3 is a block diagram showing one example of the processing system shown in FIG. 2, in more detail.

FIG. 3 is a block diagram of a portion of the machine operation system architecture 300 shown in FIG. 2. Particularly, FIG. 3 shows, among other things, examples of the processing system 338 in more detail. FIG. 3 also illustrates information flow among the various components shown. The processing system illustratively receives sensor data 402 generated by sensors 308. Processing system 338 then processes the sensor data 402 to generate processed sensor data 440. The processed sensor data 440 may indicate location of the plants of interest area boundary, the size of the plants of interest area, locations of plants of interest, locations of plants of interest rows, locations of spaces between the plants of interest rows, locations of non-plant objects, the locations of non-plants of interest areas, such as the locations of headlands or the locations of roads, as well as various other characteristics.

As illustrated in FIG. 3, processing system 338 includes plant processing component 420, non-plant processing component 422, timing circuitry 424, and can include various other items 426.

Plant processing component 420 illustratively processes the sensor data 402 generated by sensors 308 to identify the locations of plants of interests, the locations of plants of interest rows, the location of the plants of interest area boundary, and the size of the plants of interest area.

Non-plant processing component 422 illustratively processes the sensor data 402 generated by sensors 308 to identify the locations of non-plant objects (e.g., fences or fence posts, telephone or power line poles, rocks, wells, pumps, irrigation components, humans, vehicles, animals, etc.) and the locations of non-plants of interest areas, such as the locations of headlands, the locations of roads, the locations of spaces between the plants of interest rows, etc.

Timing circuitry 424 illustratively provides timestamps for the sensor data 402 generated by sensors 308. In this way, different sensor data can be correlated for the purpose of identifying characteristics. For example, the geographic location or position detected by the position sensor system 130 at a given time can be correlated to an object detected by observation sensor system 132 at the given time to determine the location of the object.

It will be noted that for some characteristics, processing system 338 need not utilize machine learning functionality (algorithms), such as a neural network. For example, processing system 338 (e.g., plants of interest processing component 440) can identify the locations of plants of interests, the locations of plants of interest rows, the location of the plants of interest area boundary, and the size of the plants of interest area based on the sensor data 402 and non-machine learning functionality (algorithms) such as, but not limited to, expert rule systems, look-up tables, thresholds, etc. As an example, but not by limitation, processing system 338 can identify plant matter (e.g., plant objects) and non-plant matter (non-plant objects) based on sensor data generated by an NIR sensor 380 in combination with non-machine learning functionality (algorithms), such as a threshold. On the other hand, for some characteristics, processing system 338 may utilize machine learning functionality (algorithms), such as a neural network, for instance, to identify particular types of plant objects or particular types of non-plant objects.

Figure 4:
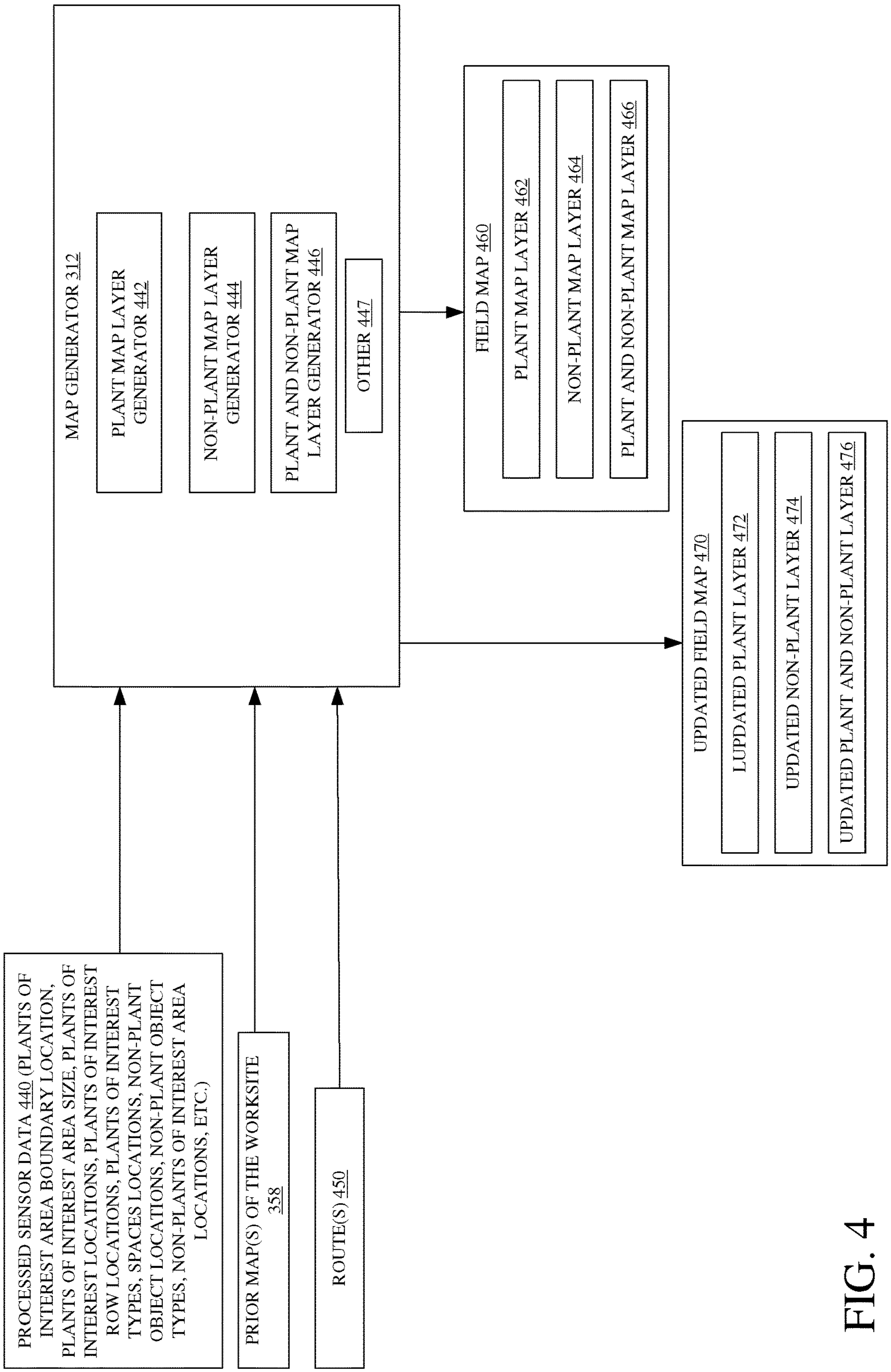
FIG. 4 is a block diagram showing one example of a map generator.

FIG. 4 is a block diagram of a portion of the machine operation system architecture 300 shown in FIG. 2. Particularly, FIG. 4 shows, among other things, the map generator 312 in more detail. FIG. 4 also illustrates information flow among the various components shown. The map generator 312 receives one or more of the processed sensor data 440, a prior worksite map 358, and a route generated by the path planning controller 337. Based on the one or more of the processed sensor data 440, and a prior worksite map 358, and a route 450, map generator 312 generates a worksite (e.g., field) map 460 that can indicate various characteristics, such as the locations of plants of interests in the worksite, the locations of plants of interest rows in the worksite, the locations of spaces between plants of interest rows in the worksite, the location of the plants of interest area as defined by the plants of interest area border, the location of non-plants of interest areas, the location of non-plant objects, a planned or prescribed route 450 generated by path planning controller 335, as well as various other characteristics. These various characteristics can be indicated in a variety of different ways, such as by the use of different display elements (e.g., symbols, etc.) display element characteristics (e.g., color, pattern, etc.).

In some examples, the worksite map 460 may include one or more map layers. As illustrated in FIG. 4, map generator 312 includes plant map layer 442, non-plant map layer 444, and plant and non-plant map layer 446. Map generator 312 can include other items 447, as well. Plant map layer generator 442 generates a plant map layer 462. Plant map layer 462 can indicate the location of the plants of interest area at the worksite, the locations of plants of interest at the worksite, the locations of the spaces between the plants of interest rows at the worksite, the locations of non-plants of interest areas (e.g., headlands, roads, etc.) at/around the worksite, and can include an indication of a planned or prescribed route 450 at the worksite. Non-plant map layer generator 444 generates a non-plant map layer 464. Non-plant map layer 464 can indicate the location(s) of non-plant object(s) which can be fixed (e.g., not likely to be moved or to change position) non-plant objects such as rocks, power and telephone lines, fences or fence posts, pumps, wells, irrigation components, etc. at the field and temporary (e.g., likely to be moved or to change position) non-plant objects such as vehicles, animals, humans, etc., the locations of non-plants of interest areas at the field, and can include an indication or a planned or prescribed route 450 at the worksite. Plants of interest and non-plants of interest map layer generator 446 generates a plant and non-plant map layer 466. Plant and non-plant map layer 466 can indicate the location of the plants of interest area at the worksite, locations of plants of interest at the worksite, locations of plants of interest rows at the worksite, locations of the spaces between the plants of interest rows at the worksite, the locations of non-plants of interest areas (e.g., headlands, roads, etc.) at/around the worksite, the location(s) of non-plant object(s) at the field, and can include an indication of a planned or prescribed route 450 at the worksite.

In some examples, worksite map 460 (or 470) includes one of the map layers or a combination of multiple map layers (e.g., two of the map layers or all three of the map layers). Where, the worksite map 460 (or 470) includes multiple map layers, interface controller 330 can generate actuatable display elements which are usable by an operator or user to toggle between the different map layers. Additionally, where the worksite map 460 (or 470) includes multiple map layers, control system 314 can selectively sort the map layers for the purposes of deriving specific data.

As the mobile machine 100 continues to travel in the non-plants of interest areas or operate in the plants of interest area, sensors 308 continue to generate sensor data 402 and processing system 338 continues to generate processed sensor data 440. Map generator 312 may then dynamically generate an updated (or revised) worksite map 470 based on the additional processed sensor data 440. The updated worksite map 470 may include one of or a combination of an updated plant map layer 472, an updated non-plant map layer 474, and an updated plant and non-plant map layer 476.

Map generator 312 thus outputs a worksite map 460 or an updated worksite 470 which can be indicative of one or more characteristics of the worksite. The worksite map 460 or the updated field map 470 can be provided to control system 314, which generates control signals to control one or more of the controllable subsystems 316 based upon the worksite map 460 or the updated worksite map 470. Alternatively, or additionally, the worksite map 460 or the updated worksite map 470 can be provided to operator 360 on an operator interface mechanism 318 or to a remote user 366 on a user interface mechanism 364, or both.

Figure 5A:
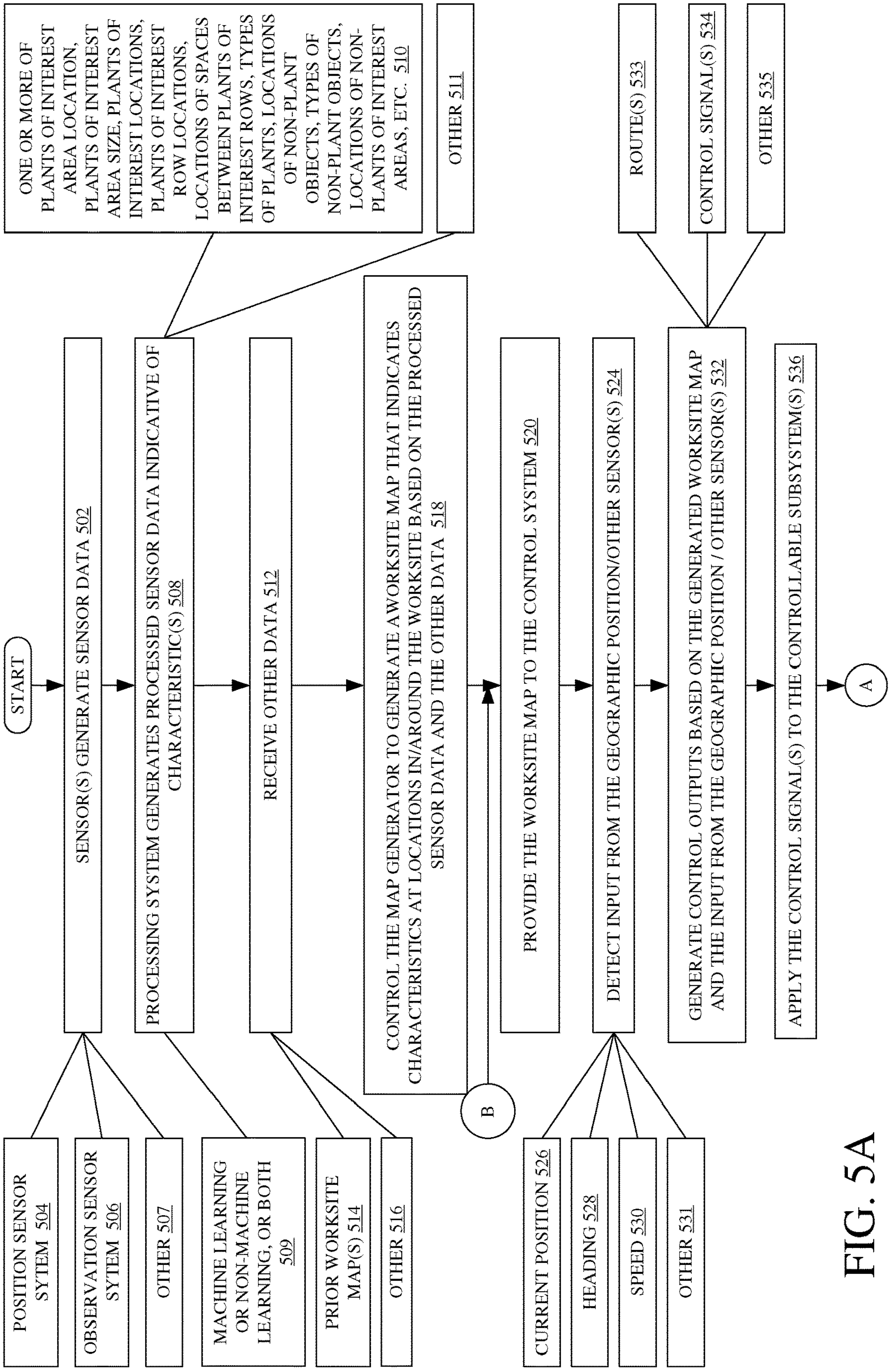
FIGS. 5A-5B (collectively referred to herein as FIG. 5) show a flow diagram illustrating one example of operation of a machine operation system in generating a map and controlling a mobile machine.
Figure 5B:
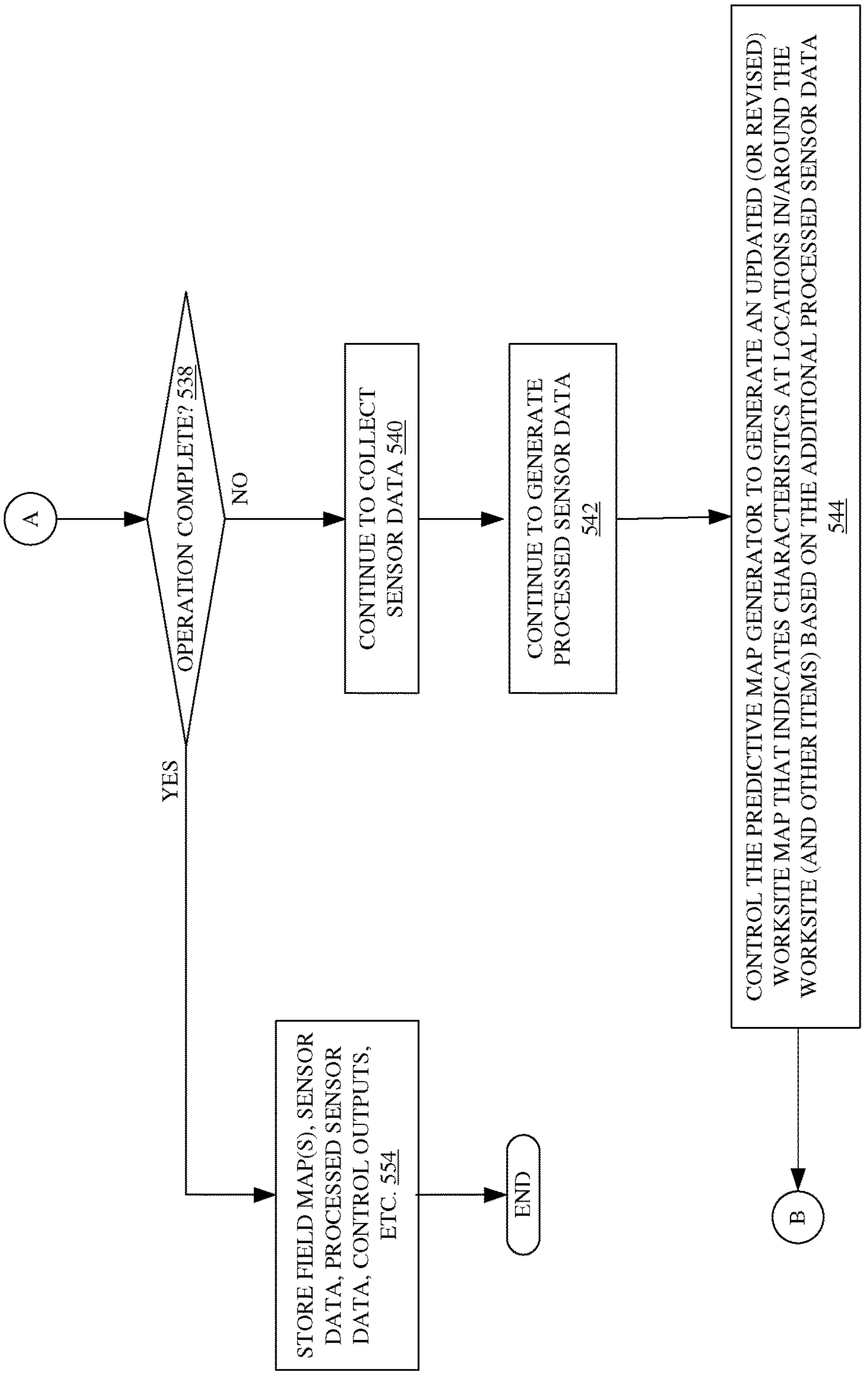

FIGS. 5A-5B (collectively referred to herein as FIG. 5) show a flow diagram illustrating one example of the operation of machine operation system architecture 300 in generating a worksite map and controlling a mobile machine.

At block 502, as mobile machine 100 is located or driving in a non-plants of interest area (e.g., a road, a headland, etc.), in-situ sensors 308 generate sensor data indicative of one or more characteristics. For example, as indicated by block 504, position sensor system 130 generates sensor data indicative of a geographic position or location of mobile machine 100. As indicated by block 506, observation sensor system 132 generates sensor data indicative of one or more characteristics of the field, such as the plants of interest area boundary, plants of interest locations, plants of interest rows, spaces between plants of interest rows, non-plant objects, non-plants of interest areas, types of non-plant objects, types of plants, etc. As indicated by block 507, in-situ sensors 308 can generate a variety of other data, including, but not limited to, heading data indicative of a heading or travel direction of mobile machine 100 or speed data indicative of a travel speed of mobile machine 100, or both.

At block 508, processing system 338 generates processed sensor data 440 indicative of one or more characteristics based on the sensor data generated at block 502. As indicated by block 510, processing system 338 may generate processed sensor data 440 indicative of one or more of plants of interest area location, plants of interest area size, plants of interest locations, plants of interest row locations, locations of spaces between plants of interest rows, types of plants, locations of non-plant objects, types of non-plant objects, locations of non-plants of interest areas, etc.

For example, based on the geographic position or location of the mobile machine 100, as indicated by sensor data generated by position system 130, and the sensor data generated by observation sensor system 132, the locations of one or more worksite characteristics can be determined and indicated by processed sensor data 440 generated by processing system 338.

As indicated by block 509, processing system 338 may utilize machine learning algorithms or non-machine learning algorithms in generating the processed sensor data 440. For example, processing system 338 may utilize non-machine algorithm(s) to process near-infrared (NIR) sensor data (e.g., generated by NIR sensor(s) 380) to detect plants and non-plant objects at the field. Thus, the locations of the plants of interest area, the plants of interest area size, plants of interest locations, the plants of interest row locations, the locations of spaces between plants of interest rows, the locations of non-plant objects, and the locations of non-plants of interest areas may be determined based on NIR sensor data and non-machine learning processing and indicated in the processed sensor data 440. However, to classify a non-plant object (e.g., determine whether a non-plant object is a fixed non-plant object, such as a rock or fence, etc., or a temporary non-plant object, such as an animal, human, or vehicle, etc.) processing system may one or more utilize machine learning algorithms. For instance, based on image sensor data (e.g., generated by cameras 384 or generated by an imager of multi-spectral imager system 385) and one or more machine learning algorithms, processing system 338 may generated processed sensor data 440 that further indicates the type of non-plant objects or the type of plant objects, or both.

In some examples, machine operation system 300 may receive other data as well, as indicated by block 512. For example, machine operation system 300 may receive one or more prior worksite maps 358 as indicated by block 514. The prior worksite map(s) 358 may indicate the location of certain features at or around the worksite and may indicate the location of the worksite. In this way, worksite characteristics indicated in the processed sensor data 440 can be incorporated into a prior map of the worksite 358 to generate a worksite map 460. In other examples, a worksite map of the field 358 need not be received, and instead, the worksite map 460 can be generated based on the processed sensor data 440. Machine operation system 300 can receive various other data as well as indicated by block 516.

At block 518, machine operation system 300 controls map generator 312 to generate a worksite map 460 based on the processed sensor data 440 and, in some examples, one or more other data items such as those received at block 512. The worksite map 460 indicates worksite characteristics at locations in and/or around the worksite as well as various other items. For example, the worksite map 460 can indicate one or more of the location of the plants of interest area in the field, the locations of plants of interests in the worksite, the locations of plants of interest rows in the worksite, locations of spaces between plants of interest rows in the worksite, the types of plant objects, the locations of non-plant objects in and/or around the field, the locations of non-plants of interest areas (e.g., headlands, roads, etc.) in and/or around the field, the types of non-plant objects, as well as other characteristics or items, such as, but not limited to, a display element that represents the location of the mobile machine 100 in the field. The characteristics and items can be represented by different colors, patterns, symbols, as well as various other types of visual indicia (e.g., display elements). As will be discussed more at block 533, routes 450 determined by control system 314 (e.g., path planning controller 333) can also be incorporated into the worksite map 460 with a visual indicium (e.g., route display element).

At block 524, the worksite map 460 (or an updated worksite map 470 as will be described later) is provided to the control system 314. At block 524, input from position sensor system 130 (e.g., geographic position sensor 304) and other sensors 308 are received by the control system 314. Particularly, at block 526, control system 314 detects an input from the geographic position sensor 304 identifying a geographic location or position of mobile machine 100. Block 528 represents receipt by the control system 314 of sensor inputs indicative of trajectory or heading of mobile machine 100 (e.g., from heading/speed sensors 325), and block 530 represents receipt by the control system 314 of a speed of mobile machine 100 (e.g., from heading/speed sensors 325). Block 531 represents receipt by the control system 314 of other information from various in-situ sensors 308. It will be understood that various controls implemented by control system 314 based on the worksite map 460 (or updated worksite map 470) may further be based on one or more of the geographic location or position of the mobile machine 100, the heading of the mobile machine 100, the travel speed of the mobile machine 100, as well as various other parameters of the mobile machine 100 which may be detected by other sensors 308 (e.g., other sensors 328).

At block 532, control system 314 generates control outputs based on the worksite map 460 (or updated worksite map 470) and, in some examples, one or more of the inputs received at block 524. At block 533, control system 314 (e.g., path planning controller 333) generates, as a control output, one or more routes 450 that are to be used by mobile machine 100 as it operates in the worksite based on the worksite map 460 (or updated worksite map 470), as well as one or more of the geographic location or position of the mobile machine 100 and the heading of the mobile machine 100. Control system 314 may determine, as a route, a route 450 that minimizes the number of passes of the mobile machine 100 in the plants of interest area, minimizes (or eliminates) overlap, and/or avoids contact between the mobile machine 100 and the plants of interests or non-plant objects, or both. The route(s) 450 can be provided to map generator 312 for incorporation into the worksite map 460 (or updated worksite map 470).

At block 534, control system 314 generates, as control outputs, one or more control signals for controlling one or more controllable subsystems (e.g., 316 and/or others) of machine operation system 300 based on the worksite map 460 (or updated worksite map 470) and, in some examples, one or more of the inputs received at block 524. The control system 314 can generate various other control outputs, as indicated by block 535.

At block 536, control system 314 applies the control signals to the controllable subsystems (e.g., 316 and/or others).

By way of example, control system 314 (e.g., interface controller 329) can generate control signals to control one or more interface mechanisms (e.g., 318 or 364), as controllable subsystems, to present (e.g., display) the worksite map 460 (or updated worksite map 470) to an operator 360 or user 366, or both.

In another example, control system 314 (e.g., path planning controller 333) can generate control signals to control steering subsystem 352 and propulsion subsystem 350 to steer and propel mobile machine 100 based on the worksite map 460 (or updated worksite map 470) and/or based on a route 450.

These are merely some examples. Control system 314 can generate a variety of different control signals to control a variety of different controllable subsystems based on the field map 460. For example, but not by limitation, where mobile machine 100 is an agricultural sprayer, control system 314 may generate control signals to control an application rate of material applied by the sprayer based on the field map 460 (or updated worksite map 470). In another example, the mobile machine 100 may include a position subsystem that is operable to control the position of one or more components (e.g., tools, implements, attachments, other components) of the mobile machine 100 and control system 314 may generate control signals to control the position subsystem (which may include one or more actuators) to control the position of the one or more components. These are merely some examples.

Additionally, it will be understood that the timing of the control signals can be based on the travel speed of the mobile machine 100, the location or position of the mobile machine 100, the speed of the mobile machine 100, as well as latencies of the system.

At block 538, a determination is made as to whether the operation has been completed. If the operation is not completed, the processing advances to block 540 where sensor data 402 from position sensor system 130, observation sensor system 132, and other sensors 308 continues to be generated. At block 542, processing system 338 continues to process the sensor data 402 to generate processed sensor data 440.

For example, in some instances, an initial worksite map 460 may be generated based on sensor data 402 generated while the mobile machine 100 is in a boundary of the plants of interest area (e.g., is in a non-plants of interest area such as a road or a headland). Then, as the mobile machine 100 operates in the plants of interest area, additional sensor data 402 is collected and the initial worksite map 460 can be updated or revised based on the additional processed sensor data 440 generated at block 542 to generate an updated or revised worksite map 470. For example, only portions of the worksite characteristics and other items in and/or around the worksite may be detectable from the boundaries (e.g., headlands, roads, etc.) of the plants of interest area. For instance, only portions of the plants of interest rows may be detectable. The portions may be sufficient to initiate operation in the plants of interest area (e.g., to generate an initial route for traversing the plants of interest area). However, once in the plants of interest area, the additional processed sensor data 440 can be used to update or revise the initial worksite map 460 to generate an updated or revised worksite map 470.

Controlling the map generator 312 to generate an updated (or revised) worksite map 470 is indicated by block 544.

If the operation has not been completed, operation moves from block 544 to block 520 where the updated (or revised) worksite map 470 is provided to the control system 314 such that additional control outputs can be generated based on the updated (or revised) worksite map 470. If the operation has been completed, operation moves from block 544 to block 554 where one or more of the worksite map 460, updated (or revised) worksite map 470, sensor data 402, processed sensor data 440, and control output(s), are stored. The worksite map 460, the updated (or revised) worksite map 470, the sensor data 402, the processed sensor data 440, and the control output(s) may be stored locally on data store 302 or sent to a remote system using communication system 306 for later use.

Figure 6:
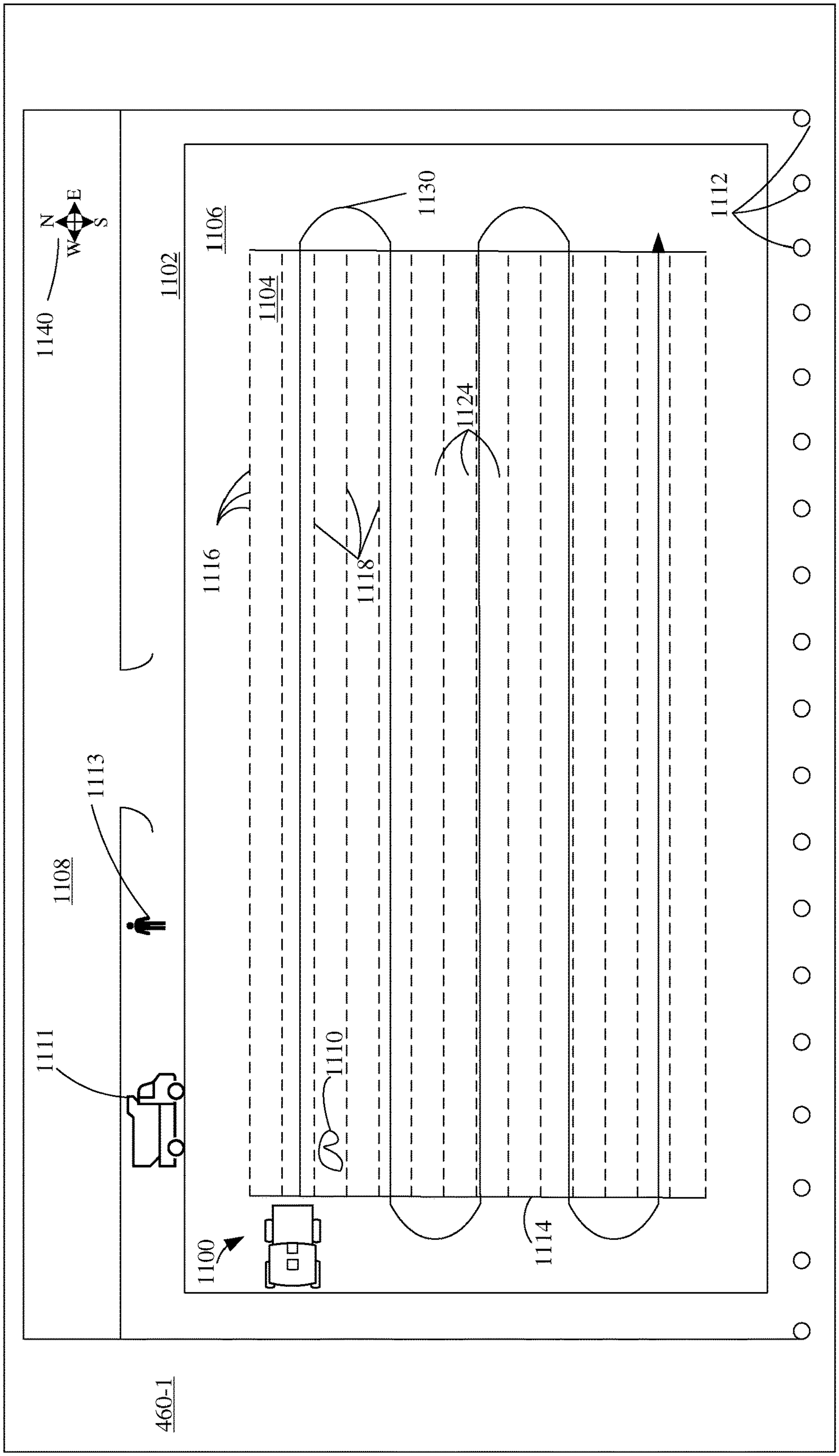
FIG. 6 illustrates a representation of a map that can be generated by a machine operation system.

FIG. 6 illustrates one example of a worksite map 460 (illustratively worksite map 460-1) that can be generated by machine operation system 300. Worksite map 460-1 includes a number of display elements (or visual indicia) that represent the locations of characteristic or objects in or around a worksite of interest. As illustrated, worksite map 460-1 includes a worksite display element 1102 that represents the worksite of interest. Worksite map 460-1 also includes non-plants of interest area display elements, illustratively a road display element 1108 that indicates the location of a road relative to the worksite of interest and a headland display element 1106 that indicates the locations of headlands in the worksite of interest. Worksite map 460-1 also includes a plants of interest area display element 1104 that indicates the location of a plants of interest area in the worksite of interest and a plants of interest area border display element 1114 that defines the bounds (e.g., area or size) of the plants of interest area in the worksite of interest. Worksite map 460-1 also includes plants of interest display elements 1116 which represent the locations of individual plants of interest in the plants of interest area; plants of interest row display elements 1118 which represent the locations of individual plants of interest rows in the plants of interest area; and spaces display elements 1124 which illustrate the locations of spaces between plants of interest rows in the plants of interest area.

Worksite map 460-1 also includes non-plant object display elements, illustratively a non-plant object display element 1110 that indicates the location of a fixed non-plant object (e.g., a rock) in the worksite of interest (illustratively in the plants of interest area), a non-plant object display element 1111 that indicates the location of a temporary non-plant object (e.g., a vehicle), a non-plant object display element 1112 that indicates the location of a fixed non-plant object (e.g., a fence) in the worksite of interest (or, as illustrated, on the border of the worksite of interest), and a non-plant object display element 1113 that indicates the location of a temporary non-plant object (e.g., a human).

Further, worksite map 460-1 includes a mobile machine display element 1100 that indicates the location of the mobile machine 100 in the worksite of interest. As can be seen in FIG. 6, mobile machine 100 is currently located in a non-plants of interest area, specifically, a headland. As illustrated in FIG. 6, worksite map 460-1 also includes a route display element 1130 that indicates a route 450 determined by control system 314 which will be used to control mobile machine 100. Worksite map 460-1 also includes a compass display element 1140. While the example in FIG. 6 shows that various characteristics and items can be represented by certain types of display elements, it will be understood that in other examples various other types of display elements can be used, includes various colors, patterns, symbols, lines, etc. For example, while a plants of interest row is represented by a dashed line and a plant of interest is represented by a dash in the dashed line, the plants of interest row and plants of interest display elements can take various other forms.

Figure 7:
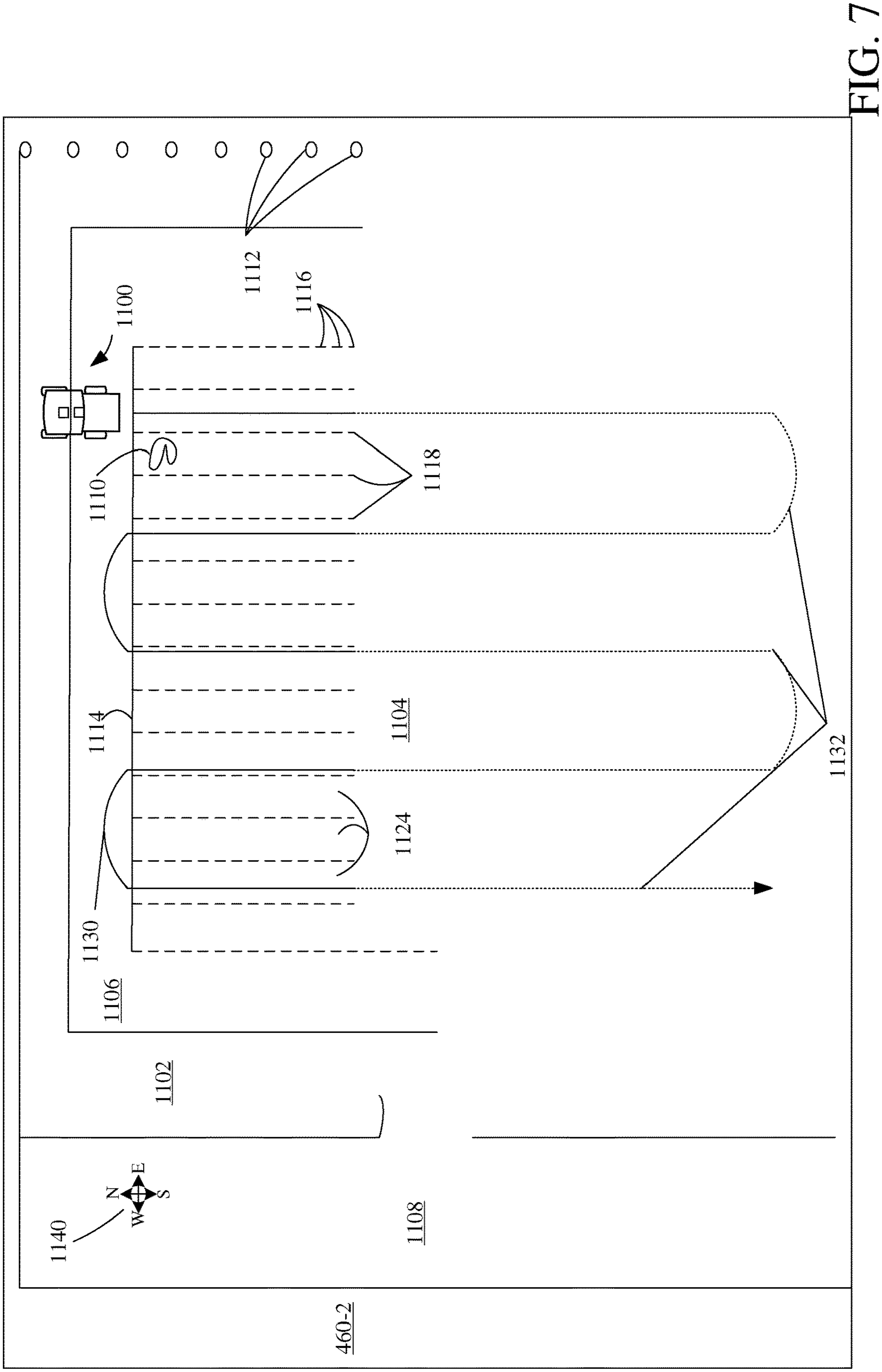
FIG. 7 illustrates a representation of a map that can be generated by a machine operation system.

FIG. 7 illustrates one example of a worksite map 460 (illustratively worksite map 460-2) that can be generated by machine operation system 300. Worksite map 460-2 is similar to worksite map 460-1 and thus similar items are numbered similarly. However, as can be seen in FIG. 7, the worksite is a different worksite and the plants of interest rows have a different direction relative compass direction (east-west in FIG. 6 and north-south in FIG. 7). In some examples, the observation sensor system 132 of mobile machine 100 may only detect portions of the worksite of interest and a worksite map can be generated that only shows characteristics and items in the detected portions. As can be seen in FIG. 7, only portions of characteristics and items are shown in map 460-2. In the illustrated example, the mobile machine 100 travelled south on the road and entered the worksite and then drove in the headlands at least to where it is currently located in the map 460-2. Along this travel path, observation sensor system 132 was able to detect only portions of items and characteristics in the worksite. As can be seen, however, the portions of items and characteristics may be sufficient to initiate an operation. As illustrated in FIG. 7, control system has still generated a route 450 which is represented by route display element 1130. However, as can be seen, a portion of the route is tentative, as represented by tentative route portion display elements 1132. As will be shown in FIG. 8, as the mobile machine 100 continues to traverse the worksite (or plants of interest area) the worksite map can be updated to generate an updated (or revised worksite map).

Figure 8:
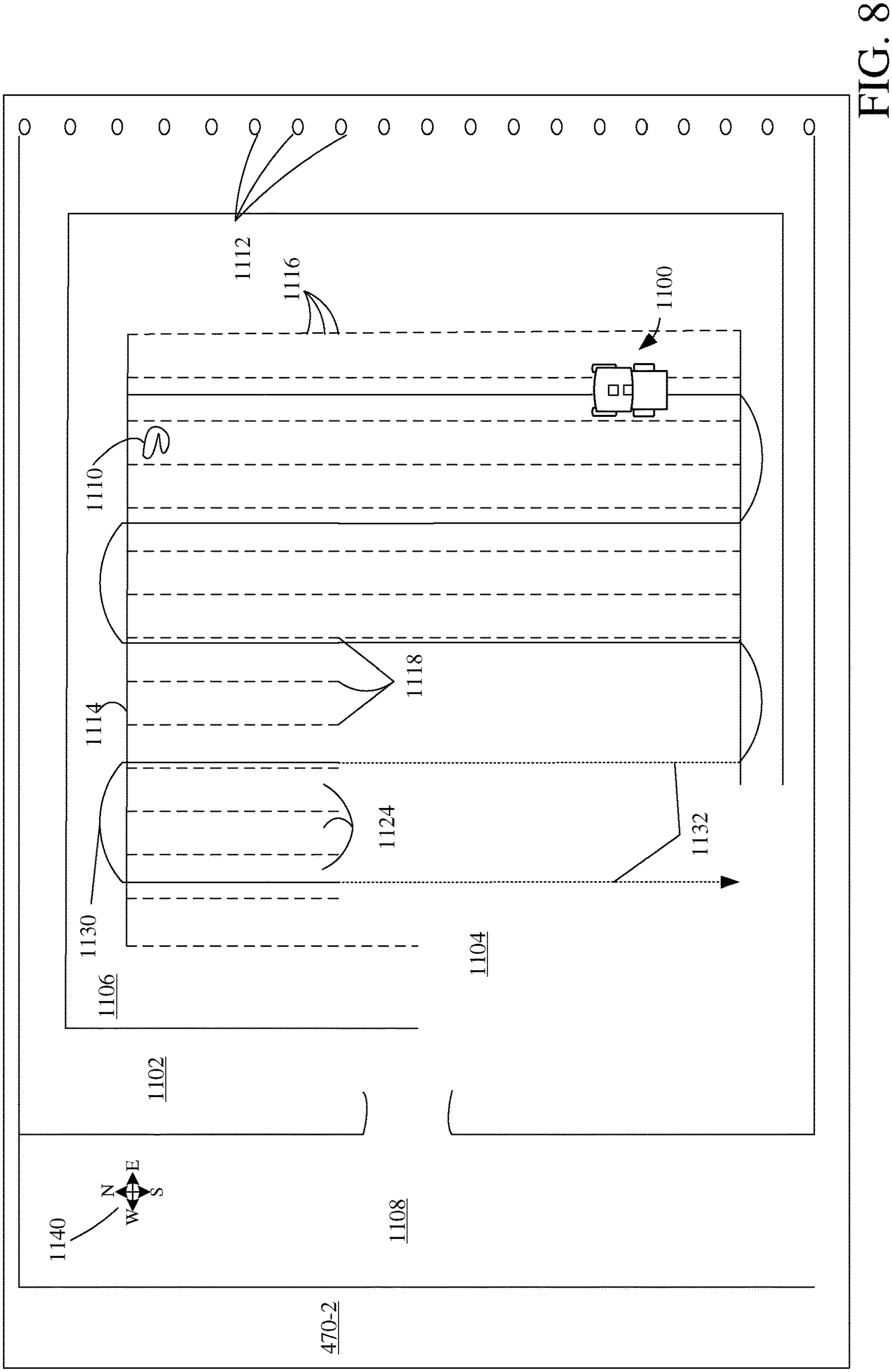
FIG. 8 illustrates a representation of a map that can be generated by a machine operation system.

FIG. 8 illustrates one example of an updated (or revised) worksite map 470 (illustratively worksite map 470-2). As can be seen in FIG. 8, the mobile machine has traveled in the plants of interest area along the route and observation sensor system 132 has continued to detect characteristics and items at the worksite. Based on the additional sensor data, map generator 312 has generated an updated (or revised) worksite map 470-2. As can be seen, the updated (or revised) worksite map 470-2 has completed characteristics and items that were previously only partial in the worksite map 460-2. Also, based on the additional sensor data, the route can be further determined such that less of the route is tentative.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, generators, and interactions. It will be appreciated that any or all of such systems, components, logic, generators, and interactions may be implemented by hardware items, such as one or more processors, one or more processors executing computer executable instructions stored in memory, memory, or other processing components, some of which are described below, that perform the functions associated with those systems, components, logic, generators, or interactions. In addition, any or all of the systems, components, logic, generators, and interactions may be implemented by software that is loaded into a memory and is subsequently executed by one or more processors or one or more servers or other computing component(s), as described below. Any or all of the systems, components, logic, generators, and interactions may also be implemented by different combinations of hardware, software, firmware, etc., some examples of which are described below. These are some examples of different structures that may be used to implement any or all of the systems, components, logic, generators, and interactions described above. Other structures may be used as well.

Figure 9:
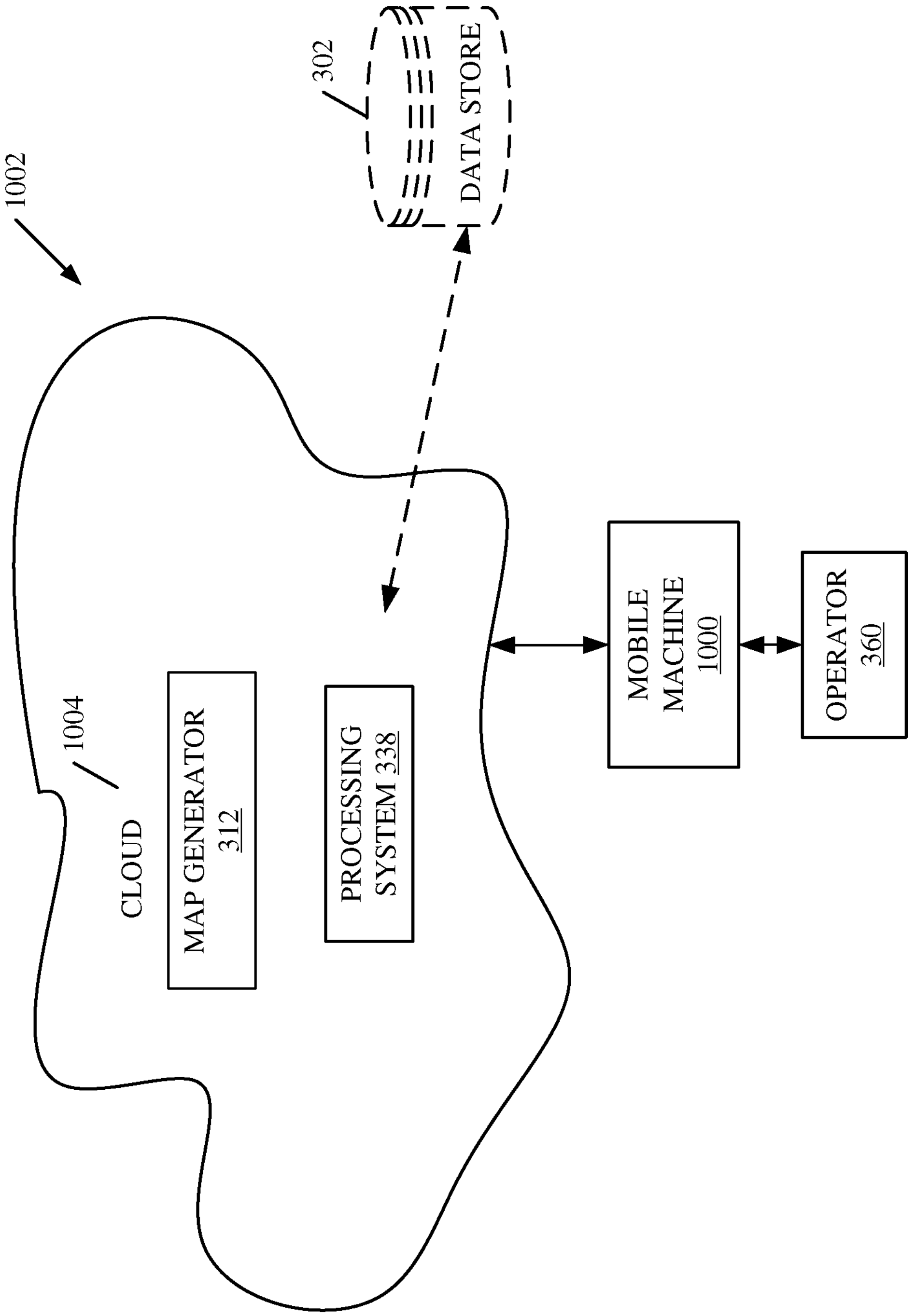
FIG. 9 is a block diagram showing one example of a mobile machine in communication with a remote server environment.

FIG. 9 is a block diagram of mobile machine 1000, which may be similar to mobile machine 100 shown in FIG. 2. The mobile machine 1000 communicates with elements in a remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 9, some items are similar to those shown in FIG. 2 and those items are similarly numbered. FIG. 9 specifically shows that processing system 338 or map generator 312, or both, may be located at a server location 1004 that is remote from the mobile machine 1000. Therefore, in the example shown in FIG. 9, mobile machine 1000 accesses systems through remote server location 1004. In other examples, various other items may also be located at server location 1004, such as data store 302, worksite maps 460, updated (or revised) worksite maps 470, and control system 314 (or portions thereof).

FIG. 9 also depicts another example of a remote server architecture. FIG. 9 shows that some elements of FIG. 2 may be disposed at a remote server location 1004 while others may be located elsewhere. By way of example, data store 302 may be disposed at a location separate from location 1004 and accessed via the remote server at location 1004. Regardless of where the elements are located, the elements can be accessed directly by mobile machine 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1000 comes close to the machine containing the information collection system, such as a fuel truck prior to fueling, the information collection system collects the information from the mobile machine 1000 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the mobile machine 1000 until the mobile machine 1000 enters an area having wireless communication coverage. The mobile machine 1000, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 10:
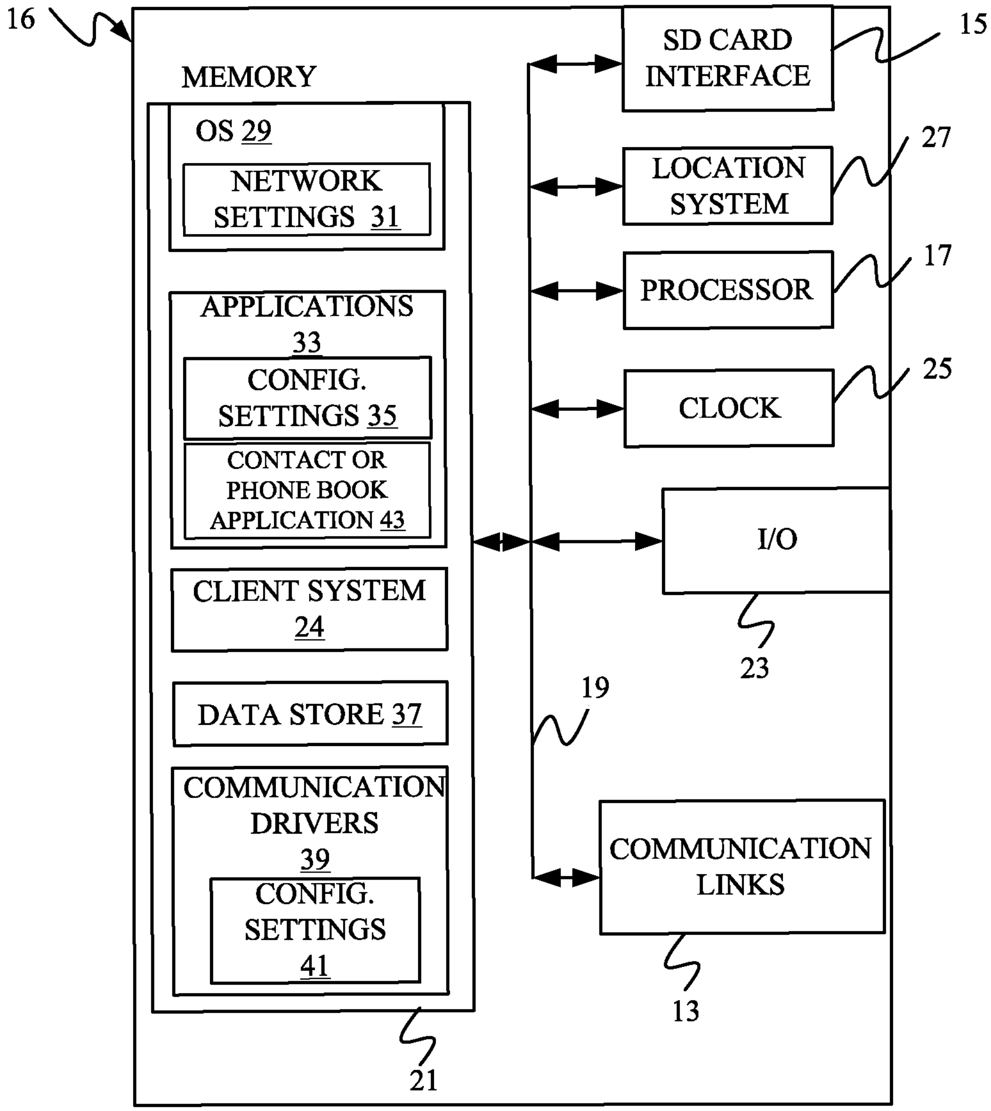
FIGS. 10-12 show examples of mobile devices that can be used in a machine operation system.
Figure 11:
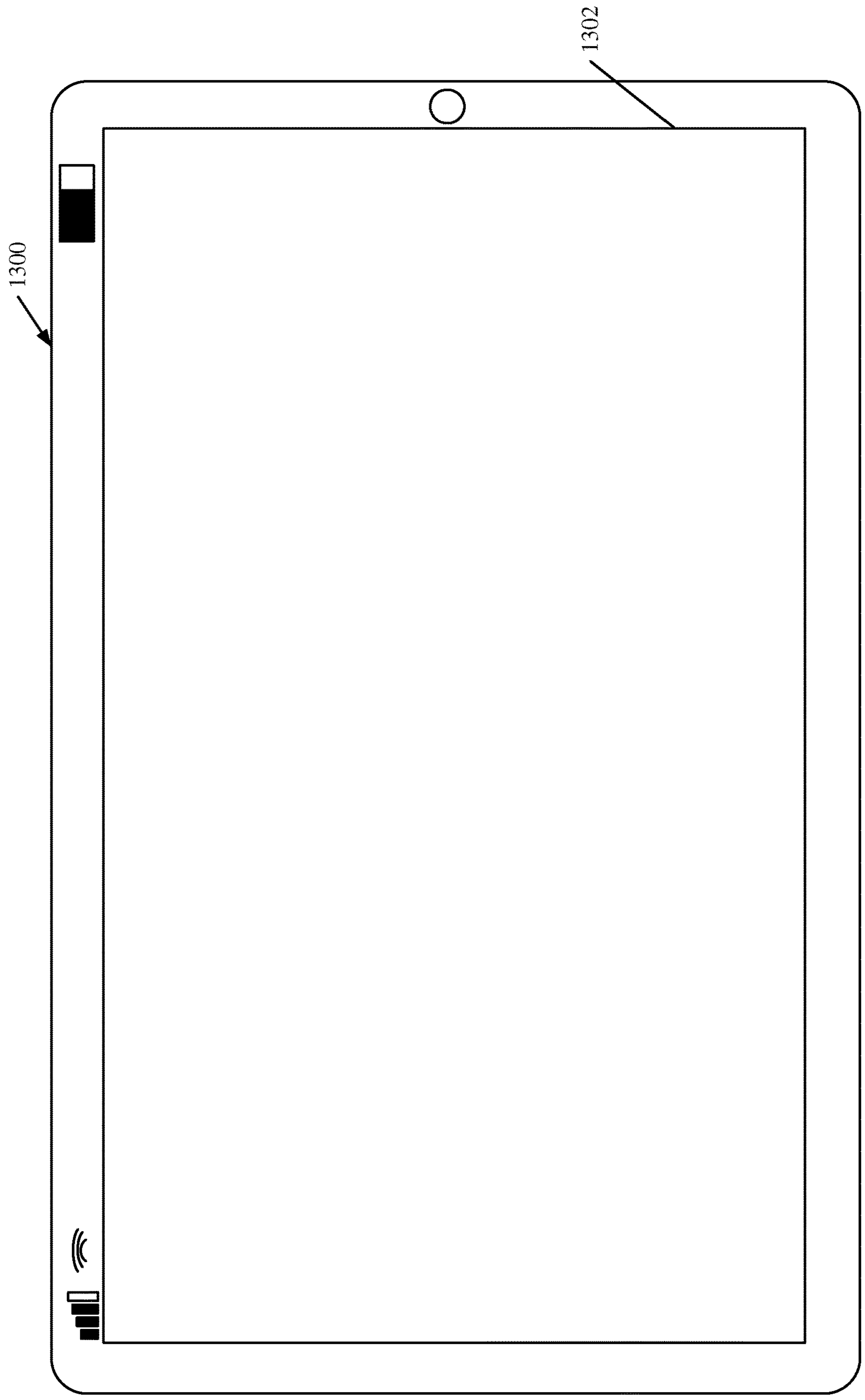
Figure 12:
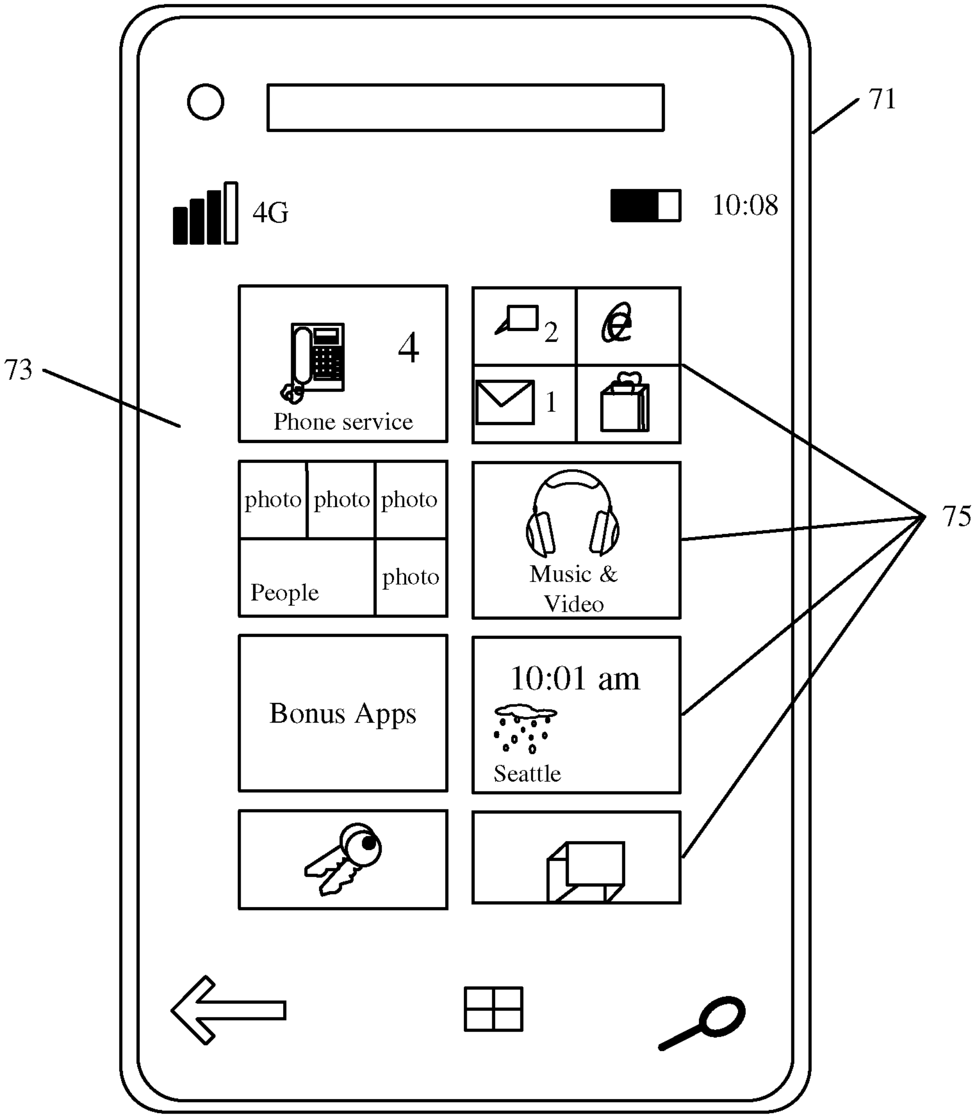

FIG. 10 is a simplified block diagram of one illustrative example of a handheld or mobile computing device that can be used as a user's or client's handheld device 16, in which the present system (or parts of it) can be deployed. For instance, a mobile device can be deployed in the operator compartment of mobile machine 100 for use in generating, processing, or displaying the maps discussed above. FIGS. 11-12 are examples of handheld or mobile devices.

FIG. 10 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 11 shows one example in which device 16 is a tablet computer 1300. In FIG. 11, computer 1300 is shown with user interface display screen 1302. Screen 1302 can be a touch screen or a pen-enabled interface that receives inputs from a pen or stylus. Tablet computer 1300 may also use an on-screen virtual keyboard. Of course, computer 1300 might also be attached to a keyboard or other user input device through a suitable attachment mechanism, such as a wireless link or USB port, for instance. Computer 1300 may also illustratively receive voice inputs as well.

FIG. 12 is similar to FIG. 11 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
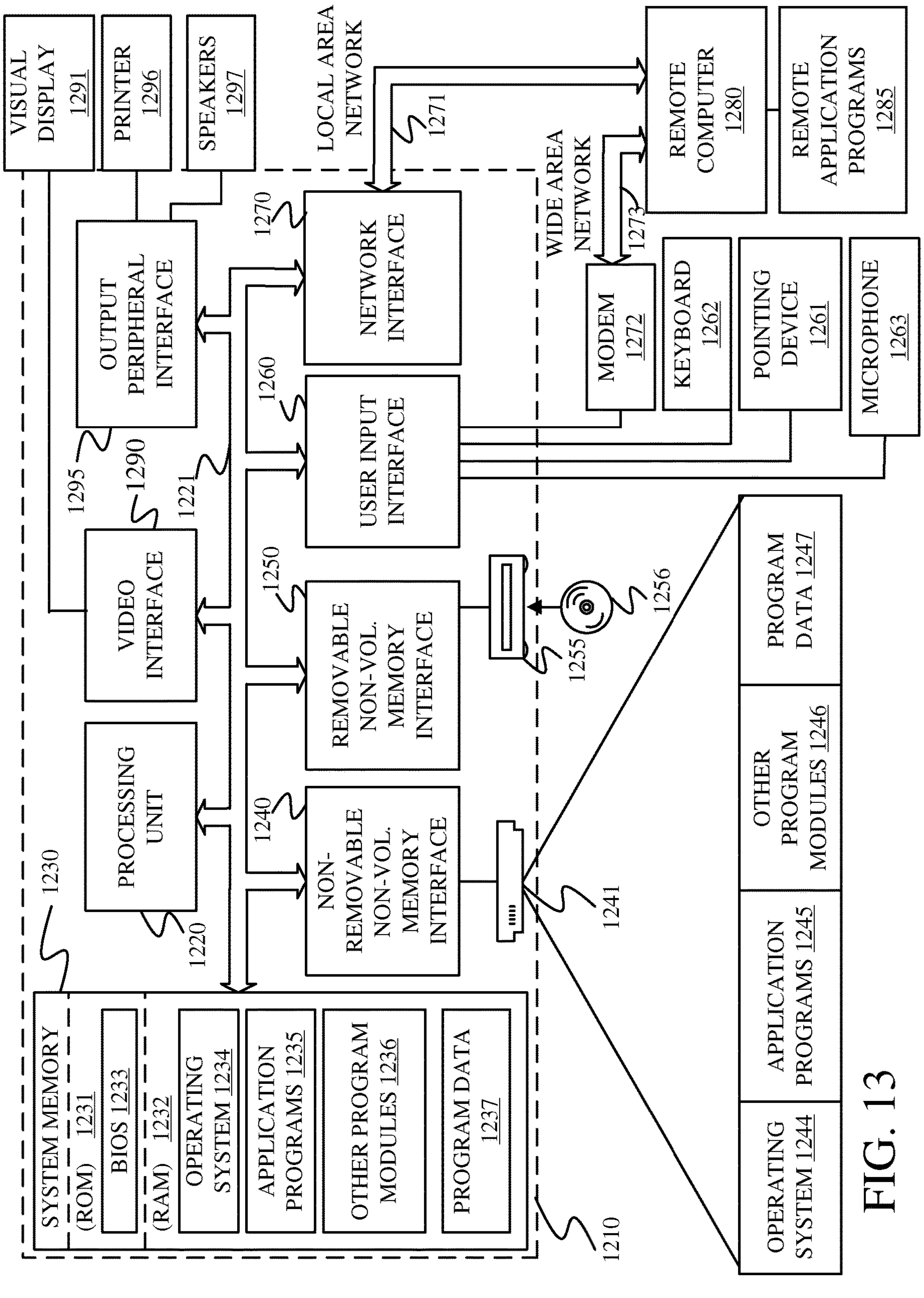
FIG. 13 is a block diagram showing one example of a computing environment that can be used in a machine operation system.

FIG. 13 is one example of a computing environment in which elements of previous figures described herein can be deployed. With reference to FIG. 13, an example system for implementing some embodiments includes a computing device in the form of a computer 1210 programmed to operate as discussed above. Components of computer 1210 may include, but are not limited to, a processing unit 1220 (which can comprise processors or servers from previous figures described herein), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 13.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 13 illustrates operating system 1234, application programs 1235, other program modules 1236, and program data 1237.

The computer 1210 may also include other removable/non-removable volatile/nonvolatile computer storage media. By way of example only, FIG. 13 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 1210. In FIG. 13, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 13 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A mobile machine comprising:

ground-engaging traction elements configured to be driven to propel the mobile machine over a surface of a worksite;

a position sensor system configured to detect a geographic location of the mobile machine in a current operation of the mobile machine at the worksite and generate location data indicative of the geographic location of the mobile machine;

an observation sensor system configured to, during the current operation of the mobile machine, detect a plurality of plants at or around the worksite, and external of the mobile machine, and generate plant data indicative of the plants;

a processing system configured to generate processed mobile machine sensor data based on the location data and based on the plant data indicative of the plurality of plants at or around the worksite, wherein the processed mobile machine sensor data generated by the processing system of the mobile machine is indicative of:

plant locations of the plurality of plants at or around the worksite, and a boundary location of at least portion of a plants of interest area boundary comprising the plurality of plants in the worksite;

a map generator configured to generate, based on the current operation of the mobile machine at the worksite, a map of the worksite, wherein the map is generated based on the processed mobile machine sensor data, that is based on the location data indicative of the geographic location of the mobile machine and the plant data indicative of the plants, wherein the map indicates the plurality of plants at the plant locations and the at least portion of the plants of interest area boundary at the boundary location; and a control system configured to control the mobile machine based on the map.

2. The mobile machine of claim 1, wherein the mobile machine comprises a mobile agricultural machine, a mobile forestry machine, a mobile construction machine, or a mobile turf management machine, and further comprising:

a control system that generates a control signal to control a controllable subsystem of the mobile machine based on the map of the worksite.

3. The mobile machine of claim 1, wherein the observation sensor system includes a near-infrared (NIR) sensor configured to detect the plants at or around the worksite, and external of the mobile machine, and to generate the plant data indicative of the plants.

4. The mobile machine of claim 1, wherein the observation sensor system comprises a multi-spectral imager that includes an imager configured to receive near-infrared (NIR) radiation reflected from plants, to detect the plants at or around the worksite, and external of the mobile machine, based on the received NIR radiation, and to generate the plant data indicative of the plants and non-plant data indicative of non-plant objects.

5. The mobile machine of claim 1, wherein the observation sensor system is configured to receive near-infrared (NIR) radiation reflected from plants and non-plant objects, external of the mobile machine, and is further configured to detect the plants and non-plant objects at or around the worksite based on the received NIR radiation, and generate the plant data indicative of the plants and non-plant data indicative of the non-plant objects;

wherein the processing system is further configured to generate the processed mobile machine sensor data further indicative of locations of the non-plant objects at or around the worksite based on the location data indicative of the geographic location of the mobile machine and the non-plant data indicative of the non-plant objects;

wherein the map generator is further configured to generate the map of the worksite that further indicates the non-plant objects at locations, of the non-plant objects, at or around the worksite.

6. The mobile machine of claim 5, wherein the map generator is configured to generate the map of the worksite to include a plant map layer indicative of the at least portion of the plants of interest area boundary at the boundary location in the worksite and indicative of the plants at the plant locations at or around the worksite, based on the processed mobile machine sensor data, a non-plant map layer indicative of the non-plant objects at the plant locations at or around the worksite, based on the processed mobile machine sensor data, and a plant and non-plant map layer indicative of the at least portion of the plants of interest area boundary at the boundary location in the worksite, indicative of the plants at the plant locations at or around the worksite, and indicative of the non-plant objects at the locations, of the non-plant objects, at or around the worksite, based on the processed mobile machine sensor data.

7. The mobile machine of claim 1, wherein the observation sensor system comprises:

a first component configured to capture near-infrared (NIR) radiation reflected from plants and non-plant objects at or around the worksite, and external of the mobile machine; and a second component configured to capture electromagnetic radiation belonging to a region of the electromagnetic (EM) spectrum different than a NIR region of the EM spectrum; and wherein the observation sensor system is configured to generate the plant data indicative of the plants and non-plant data indicative of the non-plant objects; and wherein the processing system generates the processed mobile machine sensor data indicative of locations of the plants at or around the worksite, indicative of locations of the non-plant objects at or around the worksite, and indicative of the at least portion of the plants of interest area boundary in the worksite based on the location data indicative of the geographic location of the mobile machine, the plant data indicative of the plants, and non-plant data indicative of the non-plant objects.

8. The mobile machine of claim 7, wherein the processing system is configured to utilize a non-machine learning algorithm to generate the processed mobile machine sensor data indicative of the locations of the plants at or around the worksite and the locations of the non-plant objects at or around the worksite and wherein the processing system is further configured to utilize a machine learning algorithm to generate the processed mobile machine sensor data further indicative of a type of non-plant object based on the non-plant data indicative of the non-plant objects.

9. The mobile machine of claim 1, wherein the plants of interest area boundary comprising a plurality of crop rows.

10. A computer implemented method of generating a map of a worksite, the computer implemented method comprising:

detecting a geographic location of a mobile machine in a non-plants of interest area during a current operation of the mobile machine at the worksite and generating sensor data indicative of the geographic location of the mobile machine in the non-plants of interest area;

while the mobile machine is located in the non-plants of interest area, detecting, by one or more sensors on the mobile machine, at least a portion of a boundary of a plants of interest area, that includes a plurality of plants, at the worksite, wherein the boundary of the plants of interest area separates the plants of interest area from the non-plants of interest area and generating sensor data indicative of the at least portion of the boundary of the plants of interest area detected by the one or more sensors on the mobile machine;

generating, with a processing system, processed sensor data based on the sensor data indicative of the geographic location of the mobile machine in the non-plants of interest area and the sensor data indicative of the at least portion of the boundary of the plants of interest area at the worksite, wherein the processed sensor data is indicative of a boundary location of the at least portion of the boundary of the plants of interest area in the worksite;

generating, with a map generator, the map based on and during the current operation of the mobile machine at the worksite, wherein the map is based on the processed sensor data and indicative of the at least portion of the boundary of the plants of interest area at the boundary location in the worksite; and controlling the mobile machine based on the map.

11. The computer implemented method of claim 10 wherein controlling the mobile machine comprises:

generating a route for the mobile machine based on the map of the worksite.

12. The computer implemented method of claim 10, wherein the non-plants of interest area comprises a non-crop area.

13. The computer implemented method of claim 10 and further comprising:

detecting an additional geographic location of the mobile machine in the plants of interest area and generating additional sensor data indicative of the geographic location of the mobile machine in the plants of interest area;

detecting at least an additional portion of the boundary of the plants of interest area at the worksite and generating additional sensor data indicative of the at least additional portion of the boundary of plants of interest area;

generating, with the processing system, additional processed sensor data indicative of a geographic location of the at least additional portion of the boundary of the plants of interest area at the worksite based on the additional sensor data indicative of the geographic location of the mobile machine in the plants of interest area and the sensor data indicative of the at least additional portion of the boundary of the plants of interest area at the worksite; and generating, with the map generator, an updated map of the worksite indicative of the at least portion of the boundary of the plants of interest area and the at least additional portion of the boundary of the plants of interest area in the worksite.

14. The computer implemented method of claim 10, wherein the non-plants of interest area comprises at least one of:

a headland, or a road.

15. The computer implemented method of claim 10, wherein detecting the at least portion of the boundary of the plants of interest area comprises capturing near-infrared (NIR) radiation reflected from plants or non-plant objects, or both, at the worksite and wherein generating the sensor data indicative of the at least portion of the boundary of the plants of interest area comprises generating the sensor data indicative of the at least portion of the boundary of the plants of interest area based on the captured NIR radiation.

16. The computer implemented method of claim 10 and further comprising:

detecting non-plant objects at or around the worksite and generating sensor data indicative of the non-plants objects; and generating, with the processing system, processed sensor data further indicative of geographic locations of the non-plant objects at or around the worksite based on the sensor data indicative of the geographic location of the mobile machine in the non-plants of interest area and the sensor data indicative of the non-plant objects at or around the worksite.

17. The computer implemented method of claim 10, wherein detecting the at least a portion of the boundary of the plants of interest area comprises:

controlling the mobile machine to traverse in the non-plants of interest area at least partially around the plants of interest area; and detecting, by the one or more sensors on the mobile machine, the at least a portion of the boundary of the plants of interest area while the mobile machine is traversing in the non-plants of interest area.

18. The computer implemented method of claim 10, wherein the boundary of the plants of interest area comprises a plurality of crop rows.

19. A machine operation system comprising:

a processing system configured to:

receive location data, from a position sensor on a mobile machine, indicative of a geographic location of the mobile machine in a current operation of the mobile machine at a worksite;

receive sensor data, from a sensor system on the mobile machine configured to receive near-infrared (NIR) radiation, indicative of plants and non-plant objects at or around the worksite; and generate processed sensor data based on the location data indicative of the geographic location of the mobile machine and based on the sensor data indicative the plants and non-plant objects at around the worksite, wherein the processed sensor data is indicative of plant locations of the plants at or around the worksite, and non-plant locations of the non-plant objects; and a map generator configured to generate a map of the worksite based on the current operation of the mobile machine at the worksite, wherein the map is generated with the processed sensor data and indicates the plant locations of the plants at or around the worksite and the non-plant locations of the non-plant objects; and a control system configured to control the mobile machine based on the map of the worksite.

20. The machine operation system of claim 19, wherein the control of the mobile machine comprises a commanded route for the mobile machine at the worksite.

* * * * *